United States Patent
Someya et al.

(10) Patent No.: US 6,759,996 B1
(45) Date of Patent: *Jul. 6, 2004

(54) IMAGE SIGNAL GENERATING APPARATUS, IMAGE DISPLAY UNIT, AND CONTROL METHOD ENABLING DISPLAY OF MULTIPLE IMAGES FROM A STANDARD IMAGE SIGNAL

(75) Inventors: Jun Someya, Tokyo (JP); Yoshiaki Okuno, Tokyo (JP); Takao Nakano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,130

(22) Filed: Dec. 21, 1999

(30) Foreign Application Priority Data

Jun. 14, 1999  (JP) ............................................ 11/166446

(51) Int. Cl.[7] ................................................ G09G 5/00
(52) U.S. Cl. .......................... 345/1.1; 345/3.2; 348/460
(58) Field of Search ......................... 345/3.1, 3.2, 3.3, 345/213, 1.1, 2.1, 2.2; 348/460, 558, 383; 434/118, 330

(56) References Cited

U.S. PATENT DOCUMENTS

| | | | | |
|---|---|---|---|---|
| 4,509,043 A | * | 4/1985 | Mossaides | |
| 4,759,717 A | * | 7/1988 | Larochelle et al. | |
| 4,788,540 A | * | 11/1988 | Tokumitsu et al. | |
| 4,931,879 A | * | 6/1990 | Koga et al. | |
| 5,036,315 A | * | 7/1991 | Gurley | |
| 6,061,048 A | * | 5/2000 | Choi | |

FOREIGN PATENT DOCUMENTS

| | | |
|---|---|---|
| JP | A-5127856 | 5/1993 |
| JP | A-5249932 | 9/1993 |
| JP | 09-274475 | * 10/1997 |
| JP | 10-187109 | 7/1998 |
| JP | 2001-013937 | 1/2001 |

OTHER PUBLICATIONS

English Translation (Human translation) of JP 09–274475.

* cited by examiner

Primary Examiner—Regina Liang
(74) Attorney, Agent, or Firm—Birch, Stewart, Kolasch & Birch LLP

(57) ABSTRACT

An image signal generating unit supplies a single image signal to multiple image display units having different unit numbers. Embedded in the image signal is an index signal designating the image display units on which the image signal is to be displayed. Each image display unit compares its unit number with the index signal to select displayable frames of the image signal, preferably storing and displaying the most recent selected frame. Each image display unit can thereby display a different image. The image signal may have a standard format.

28 Claims, 35 Drawing Sheets

FIG. 9

| SELECTED UNIT NUMBERS | F1 | F2 | F3 | F4 | F5 | F6 | F7 | F8 |
|---|---|---|---|---|---|---|---|---|
| 1,2,3,4,5,6,7,8 | ○ | ○ | ○ | ○ | ○ | ○ | ○ | ○ |
| 1 | ○ | ● | ● | ● | ● | ● | ● | ● |
| 2 | ● | ○ | ● | ● | ● | ● | ● | ● |
| 3 | ● | ● | ○ | ● | ● | ● | ● | ● |
| 4 | ● | ● | ● | ○ | ● | ● | ● | ● |
| 5 | ● | ● | ● | ● | ○ | ● | ● | ● |
| 6 | ● | ● | ● | ● | ● | ○ | ● | ● |
| 7 | ● | ● | ● | ● | ● | ● | ○ | ● |
| 8 | ● | ● | ● | ● | ● | ● | ● | ○ |
| 1,2,3 | ○ | ○ | ○ | ● | ● | ● | ● | ● |
| 2,3,5,7 | ● | ○ | ○ | ● | ○ | ● | ○ | ● |
| NONE | ● | ● | ● | ● | ● | ● | ● | ● |

IMAGE SIGNAL GENERATING APPARATUS, IMAGE DISPLAY UNIT, AND CONTROL METHOD ENABLING DISPLAY OF MULTIPLE IMAGES FROM A STANDARD IMAGE SIGNAL

BACKGROUND OF THE INVENTION

The present invention relates to an image signal generating apparatus, an image display unit, and a control method for an image display unit useful in, for example, a personal computer system having a plurality of image display units.

Examples of image display units to which the invention is applicable include liquid crystal display (LCD) units, cathode-ray tube (CRT) units, digital micromirror device (DMD) units, plasma display panel (PDP) units, and field-emission display (FED) units.

As a conventional example of a system with multiple image display units, FIG. 1 shows a system in which a single image signal generating unit 101 supplies separate image signals through separate cables to four image display units 102 simultaneously. The image signals are generated separately by four image signal generators 103. The image signal generators 103 comprise, for example, hardware circuits disposed on one or more expansion cards installed in a personal computer. Each image signal generator 103 has a separate cable connector. Each image signal, and each image display unit 102, has a standard resolution such as seven hundred sixty-eight lines with one thousand twenty-four picture elements or pixels per line (1024×768 pixels). The four image signals may be combined, as shown, to form a single image with a higher resolution (2048×1536 pixels).

A problem with this conventional system is that each time an image display unit is added to the system configuration, another image signal generator 103 and another interconnecting cable are required. The number of image display units 102 that can be controlled is thus limited by the expansion capacity of the personal computer. Often, the personal computer lacks space for an adequate number of display signal generators 103, or for an adequate number of cable connectors.

FIG. 2 shows another conventional example, in which the image signal generating unit 101 has a single image signal generator 103 that generates a high-resolution signal (for example, a signal with a resolution of 2048×1536 pixels). The high-resolution signal is distributed to four image display units 102, each having a lower resolution (1024×768 pixels, for example). Each image display unit 102 displays one quadrant of the image.

A problem in this configuration is that high-speed digital-to-analog (D/A) and analog-to-digital (A/D) converters are required to generate and process the high-resolution image signal. High-speed D/A and A/D converters are expensive, and their performance limits both the attainable resolution and the quality of the displayed image. In practice, the limited performance of available D/A and A/D converters tends to degrade the image quality.

SUMMARY OF THE INVENTION

An object of the present invention is to enable a single image signal generating unit, generating a standard image signal, to display different images on different image display units.

Another object is to enable the number of image display units coupled to the image signal generating unit to be increased easily.

A further object is to enable a user to use one image display unit for normal input and editing work, while referring to reference images displayed on other image display units.

An image signal generating unit or apparatus according to the present invention comprises an image signal generator generating an image signal, and an indexer adding an index signal to the image signal, replacing part of the image signal. The index signal designates an image display unit by which the image signal is to be displayed.

An image display unit according to the present invention comprises an image signal receiving circuit, a frame selection unit, and an image display apparatus. The image signal receiving circuit receives a composite signal including an image signal divided into frames, a synchronizing signal, and an index signal. The frame selection unit selects certain frames of the image signal according to the index signal. The image display apparatus displays the selected frames. The frame selection unit preferably includes an image memory for storing the most recently selected frame.

A method of controlling an image display unit according to the present invention comprises the steps of:

(a) receiving an image signal divided into frames;

(b) selecting certain frames according to an index signal included in the image signal; and (c) displaying the selected frames.

The invention enables the image signal generating unit to direct different images to different image display units by switching the value of an index signal embedded in a standard image signal.

The image signal generating unit outputs a single image signal, the format of which does not change when further image display units are added, so image display units can be added easily.

Image display units having image memories can display reference images without interrupting normal input and editing operations.

BRIEF DESCRIPTION OF THE DRAWINGS

In the attached drawings:

FIG. 9 illustrates the meaning of the index signal;

DETAILED DESCRIPTION OF THE INVENTION

Figure 1:
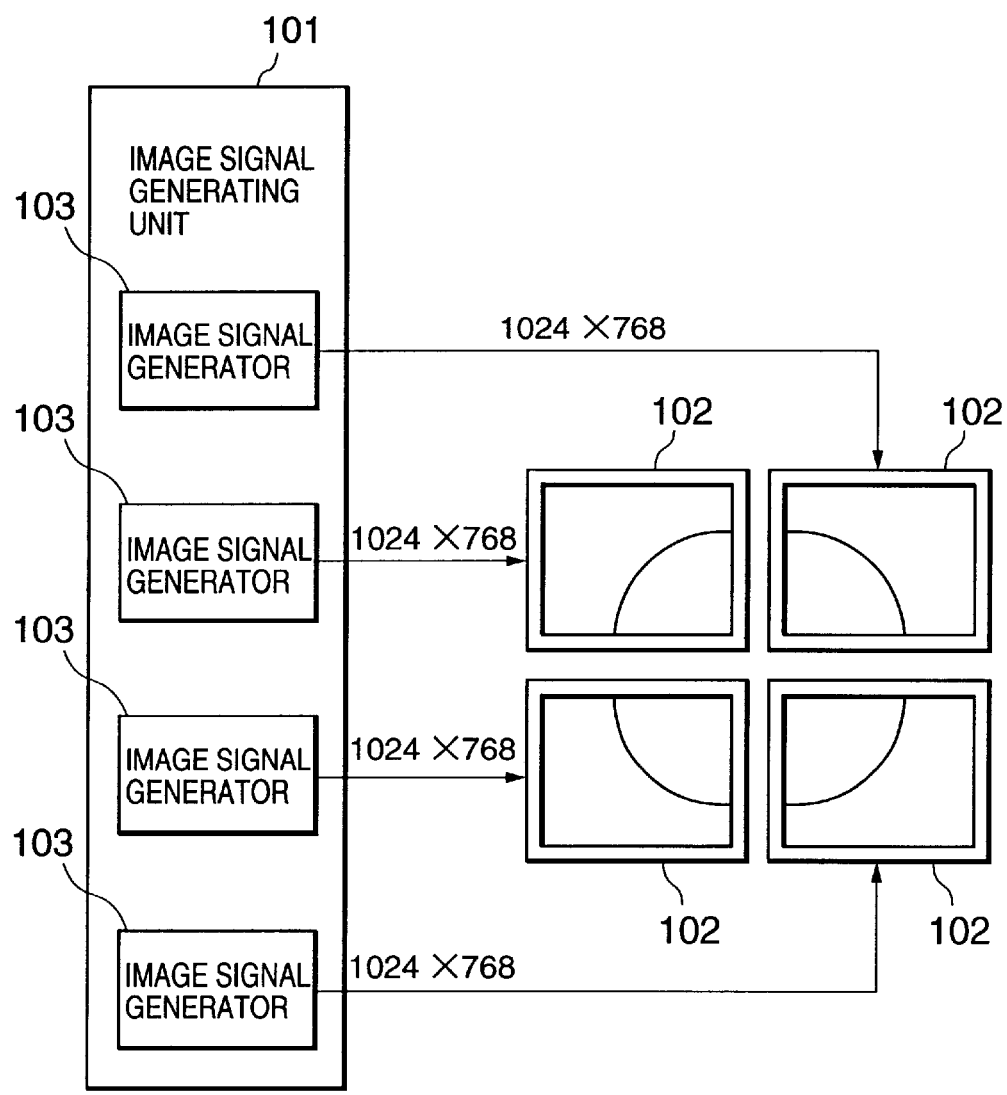
FIG. 1 illustrates a conventional image display system.
Figure 2:
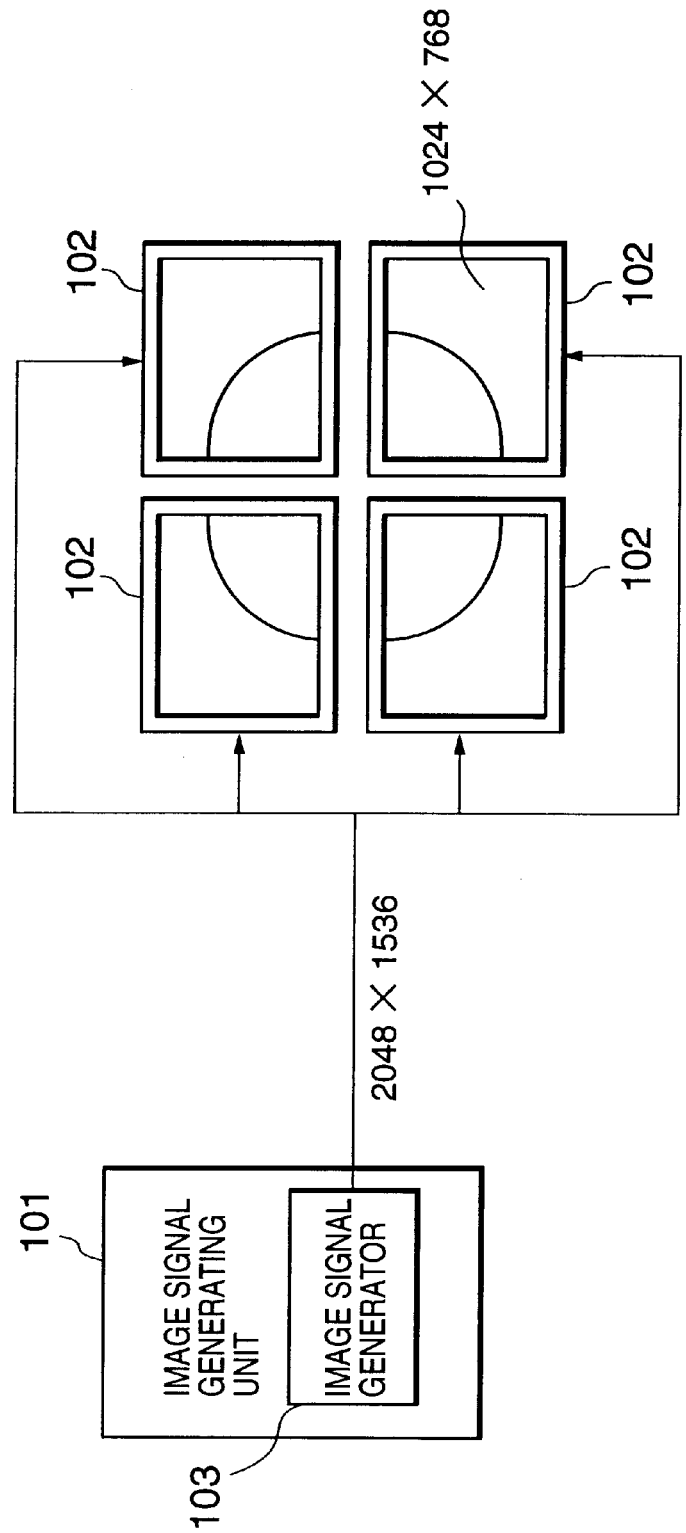
FIG. 2 illustrates another conventional image display system.

Embodiments of the invention will be described with reference to the attached drawings, in which like parts are indicated by like reference characters. In the waveforms in timing diagrams, the horizontal axis represents time and the vertical axis represents voltage level.

Figure 3:
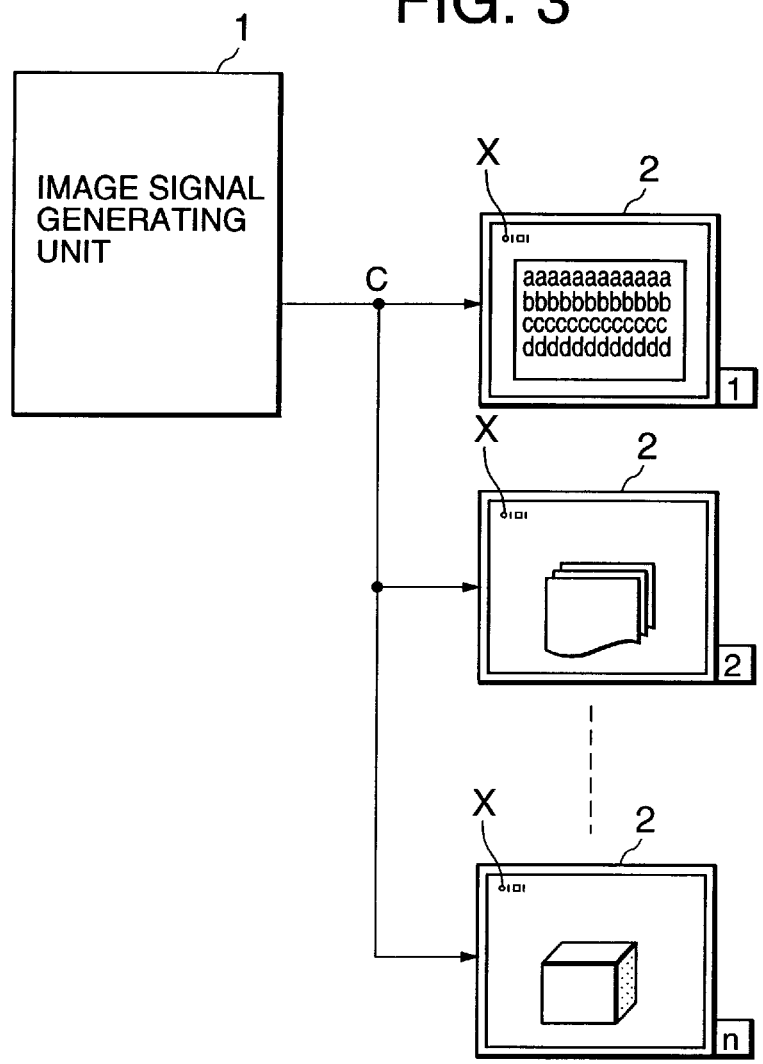
FIG. 3 illustrates the general configuration of an image display system according to a first embodiment of the invention.

FIG. 3 shows the general configuration of an image display system illustrating a first embodiment. In this system, an image signal generating unit 1 installed in a personal computer is coupled to n image display units 2, where n is a number greater than one. The coupling is effected in parallel by, for example, electrical cables and a branching coupler, so that all n image display units receive the same signal C from the image signal generating unit 1.

The image display units 2 are identified by unit numbers set in the image display units themselves. In the drawing, the image display units have consecutive unit numbers from one to n. It is not necessary, however, for the unit numbers to be consecutive, and they need not all be different. If two or more image display devices 2 share the same unit number, they will display the same image. The unit numbers have a limited range of values; in the following description, the range is from one to eight (1–8).

The signal C supplied from the image signal generating unit 1 is a composite signal including an image signal, a synchronizing signal, and an index signal X. The index signal X may be superimposed on the displayed part of the image signal, replacing part of the displayed image, preferably in an inconspicuous location, as shown. Alternatively, the index signal may be transmitted during a non-displayed interval or blanking interval of the image signal. The phrase 'added to the image signal' will be used below to describe both of these cases.

Figure 4:
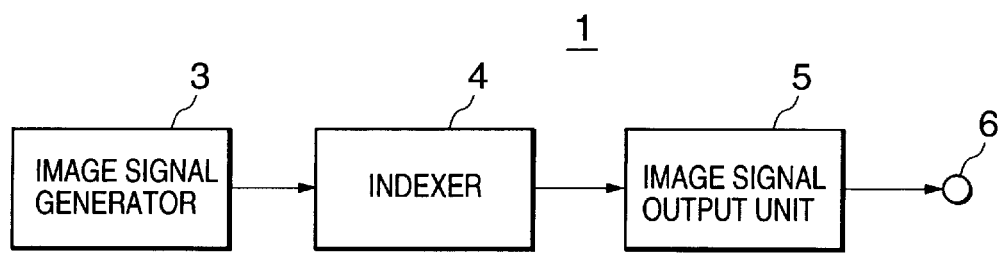
FIG. 4 is a block diagram showing the internal structure of the image signal generating unit in FIG. 3.

Referring to FIG. 4, the image signal generating unit 1 comprises an image signal generator 3, an indexer 4, and an image signal output unit 5. The image signal generator 3 generates the image signal. The indexer 4 adds the index signal to the image signal, replacing part of the image signal. The image signal output unit 5 adds horizontal and vertical synchronizing pulses to the output of the indexer 4, and amplifies the resulting signal for output from an image signal output terminal 6 to the image display units 2 as the composite signal C. The composite signal C is an analog signal.

The image signal generator 3 and image signal output unit 5 are hardware circuits of the type commonly found in personal computers. The indexer 4 is an additional hardware circuit that is controlled by, for example, system software running on the personal computer. A detailed circuit description of the indexer 4 will be omitted, as those skilled in the art will know how to make a circuit that replaces part of one signal with another signal in response to commands received from software.

The composite signal C is divided into frames, each frame including a complete image to be displayed by one of the image display units 2. The indexer 4 adds the index signal to at least some of the frames, but not necessarily to all of the frames, as will be illustrated in a variation of the first embodiment.

Figure 5:
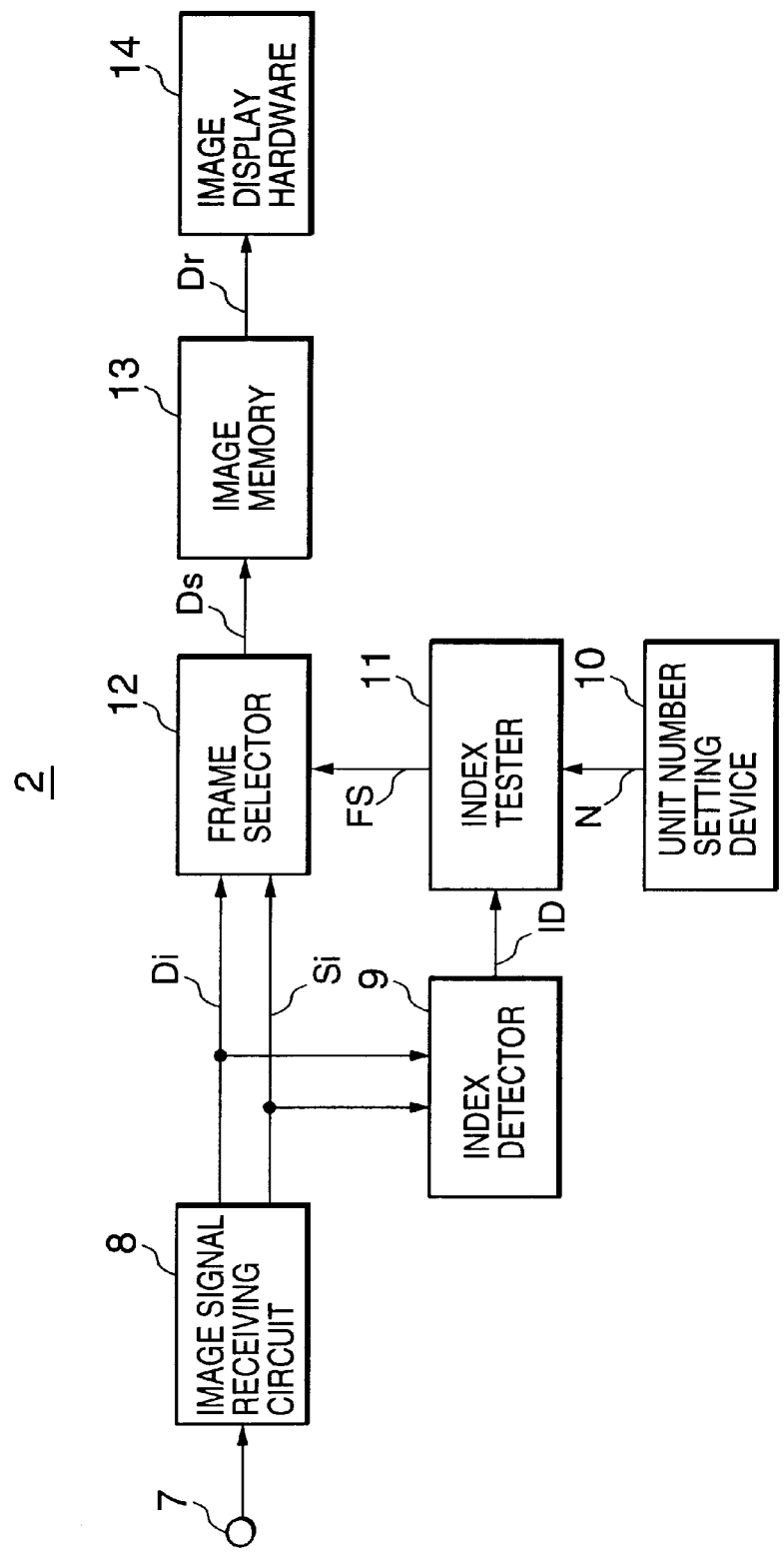
FIG. 5 is a block diagram showing the internal structure of the image display units in FIG. 3.

Referring to FIG. 5, each image display unit 2 comprises an image signal input terminal 7, an image signal receiving circuit 8, an index detector 9, a unit number setting device 10, an index tester 11, a frame selector 12, an image memory 13, and image display hardware 14.

The image signal receiving circuit 8 separates the composite signal C received from the image signal input terminal 7 into an image signal Di and a synchronizing signal Si. The index detector 9 receives both of these signals Di and Si, extracts the index signal from the image signal Di, and outputs index data ID to the index tester 11. The unit number setting device 10 outputs the unit number N set in the image display unit 2. The unit number setting device 10 is, for example, a dual in-line switch or DIP switch in which the unit number N is set manually. The index tester 11 compares the index data ID and unit number N, and thereby generates a frame selection signal FS, which is supplied to the frame selector 12. The frame selector 12 also receives the image signal Di and synchronizing signal Si from the image signal receiving circuit 8, and stores selected frames of the image signal, denoted Ds in the drawing, in the image memory 13.

The image display hardware 14 reads the data Dr stored in the image memory 13 and displays the image thus read on a display screen or panel, such as an LCD, CRT, DMD, PDP, or FED panel.

The index detector 9, unit number setting device 10, index tester 11, frame selector 12, and image memory 13 constitute a frame selection unit that selects the frames of the image signal Di that are displayed by the image display hardware 14.

Figure 6:
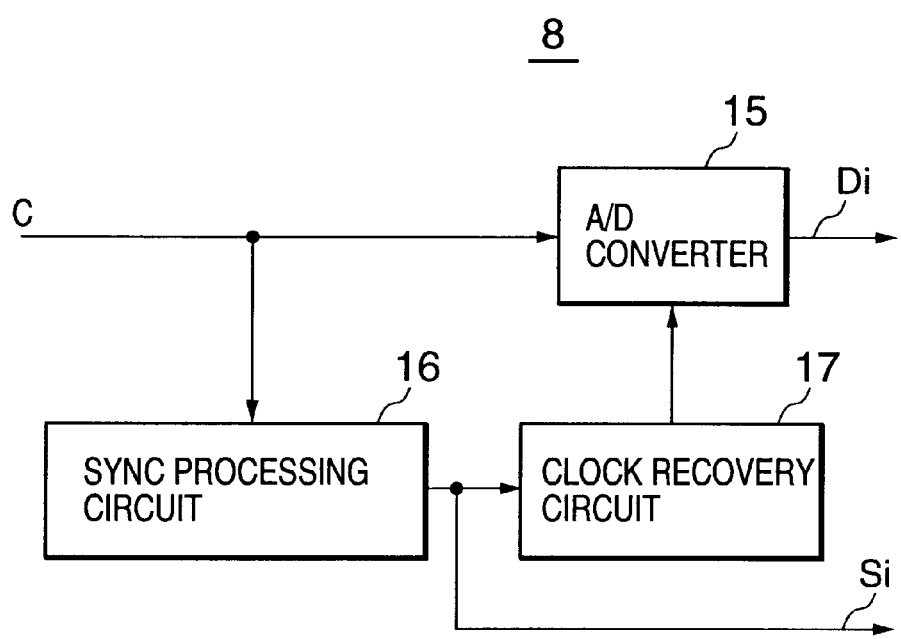
FIG. 6 is a block diagram showing the internal structure of the image signal receiving circuit in FIG. 5.

Referring to FIG. 6, the image signal receiving circuit 8 comprises an A/D converter 15, a synchronizing signal (sync) processing circuit 16, and a clock recovery circuit 17. The synchronizing signal processing circuit 16 separates the synchronizing signal Si from the composite signal C. The clock recovery circuit 17 uses the synchronizing signal Si to generate a clock signal, which is supplied to the A/D converter 15. The clock signal has a predetermined frequency, and a phase locked to the synchronizing pulses in the synchronizing signal. Using the supplied clock signal as a sampling clock, the A/D converter 15 converts the composite signal C from analog to digital form to generate the image signal Di.

Next, the operation of the first embodiment will be described.

The image signal generated by the image signal generator 3 has a standard format in which each frame has a predetermined number of horizontal scanning lines, each comprising a predetermined number of pixels, and frames are output at a predetermined rate. The index signal X generated by the indexer 4 includes information related to the unit numbers of the image display units 2. The index signal X may also include header information, control information, and check information, as illustrated in variations of the first embodiment later. The composite signal C, including the image signal, the index signal, and the horizontal and vertical synchronizing pulses added by the image signal output unit 5, is transmitted from the output terminal 6 of the image signal generating unit 1 to the input terminal 7 of each image display unit 2.

Figure 7:
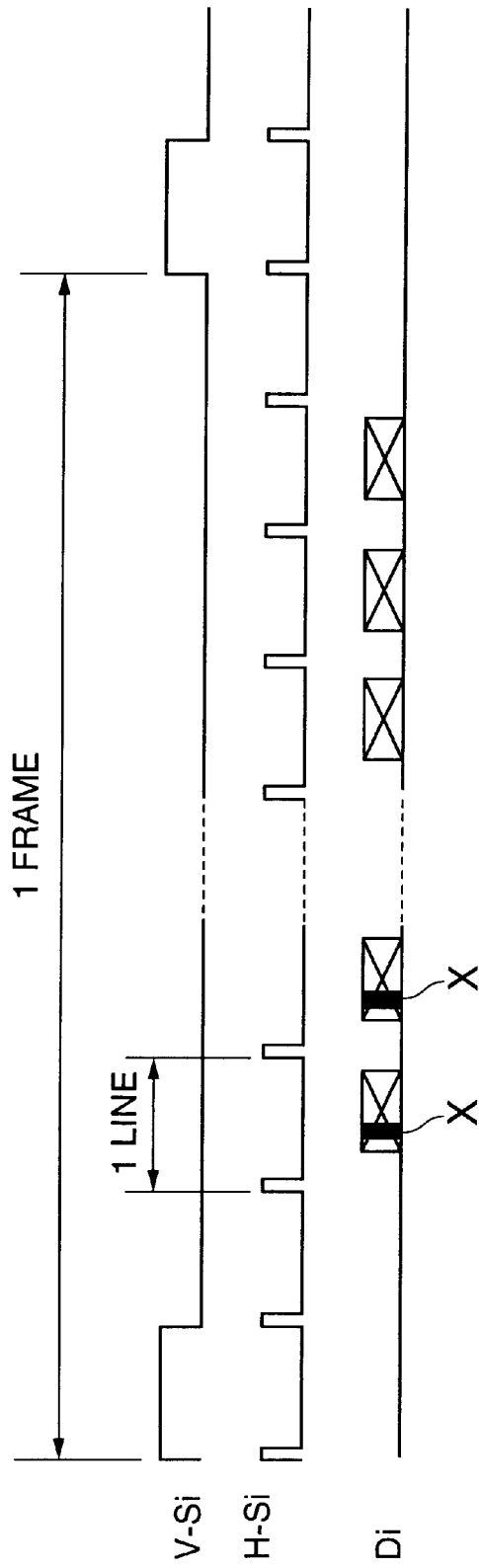
FIG. 7 is a timing diagram illustrating the synchronizing signals, image signal, and index signal in the first embodiment.

FIG. 7 illustrates the timing relationships of the horizontal synchronizing pulses H-Si, vertical synchronizing pulses V-Si, and image signal Di. The detailed waveform of the image signal is not shown, but the intervals containing pixel data that will actually be displayed are indicated, each such interval corresponding to one horizontal scanning line. The indexer 4 inserts the index signal X in predetermined positions in, for example, the first two horizontal scanning lines displayed in each frame. The same index information is repeated in each of these two scanning lines.

Figure 8:
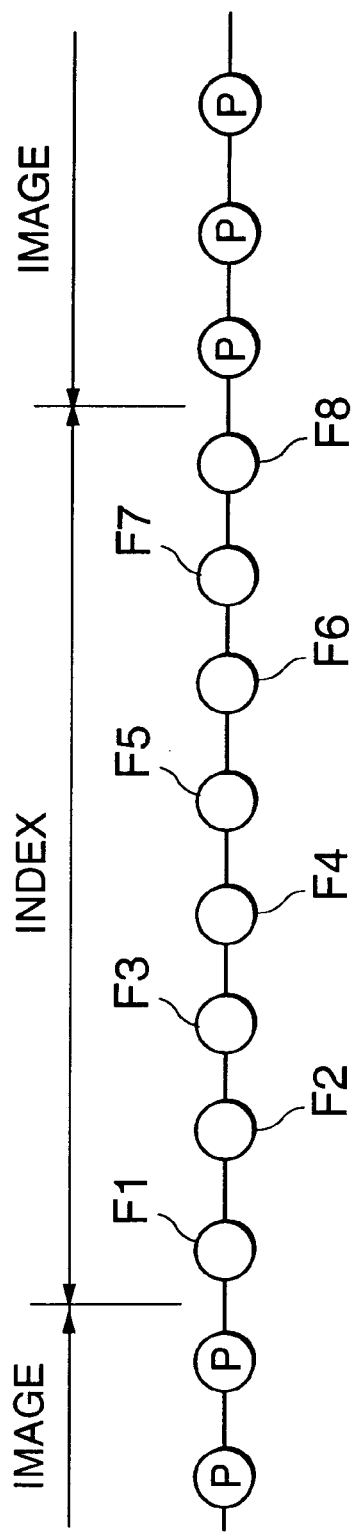
FIG. 8 illustrates the structure of the index signal.

Referring to FIG. 8, the index signal comprises, for example, eight consecutive pixels F1 to F8. These pixels, and the other pixels P to the right and left, have values on a luminance scale ranging from zero to, for example, two hundred fifty-five. The indexer 4 sets each of pixels F1 to F8 to the minimum or maximum luminance level (0 or 255). These pixels are binary flags, the minimum luminance level representing the off-state or logical '0' and the maximum luminance level representing the on-state or logical '1'. The eight flag pixels F1 to F8 in the index signal correspond by position to the possible unit numbers (1–8) of the image display units.

Referring to FIG. 9, by manipulating the corresponding flag pixels, the indexer 4 indicates which image display units are to display each frame. For example, to have a frame displayed by all image display units, the indexer 4 sets all eight flag pixels to the logical '1' state (luminance level 255), indicated by a white circle in the drawing. To have a frame displayed only by image display unit number one, the indexer 4 sets the first flag pixel (F1) to the logical '1' state, and sets the other seven flag pixels to the logical '0' state (luminance level 0), indicated by a black circle in the drawing. The image display units with unit numbers two to eight are singled out in similar fashion, by setting just one of the eight flag pixels to the logical '1' state. The indexer 4 can also designate an arbitrary group of image display units: for example, the image display units with unit numbers from one to three, by setting the first three flag pixels to the logical '1' state; or the image display units with unit numbers two, three, five, and seven, by setting the corresponding the flag pixels to the logical '1' state. In addition, the indexer 4 can set all flag pixels to the logical '0' state to indicate that a frame should not be displayed by any image display unit. In total, there are two hundred fifty-six possible patterns of the eight flag pixels, designating different image display units singly or in groups.

Figure 10:
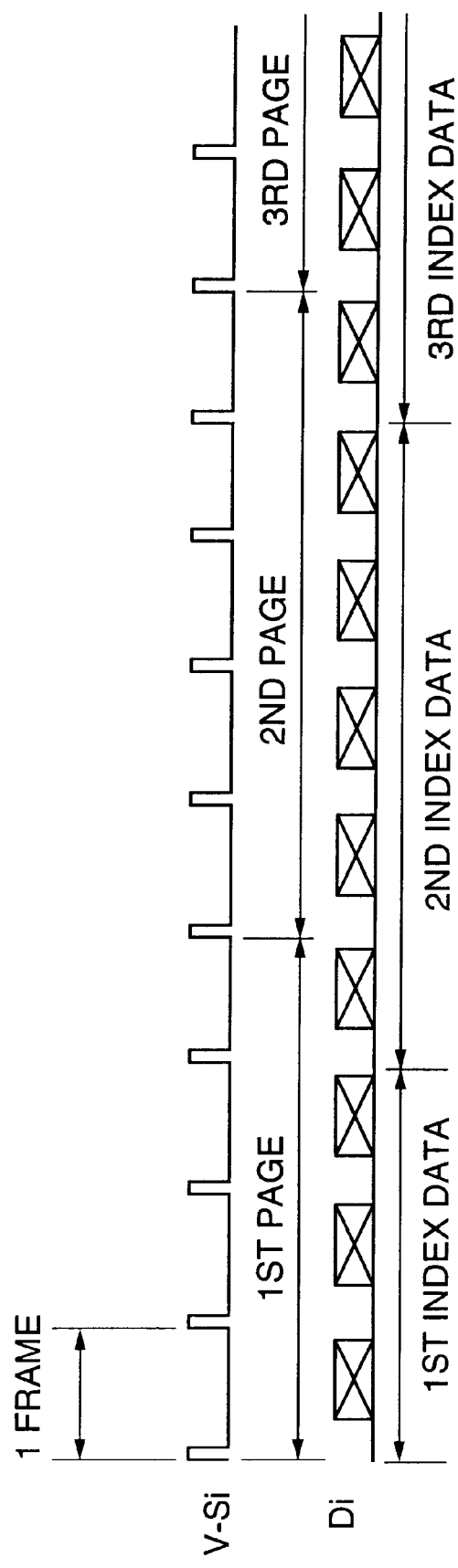
FIG. 10 is a timing diagram illustrating the timing relationship between the index signal and pages of the image signal.

Referring to FIG. 10, the image signal output by the image signal generator 3 switches from time to time between different pages. For example, the image signal generator 3 may output a first page of text for a few frames, followed by a second page of numerical data for the next few frames, then a third page showing a pictorial image. These pages are generated by, for example, three different application programs running on the same personal computer. Each page is displayed by a different image display unit, or a different group of image display units, which are designated by first index data, second index data, and third index data. The designation made by the index data applies to the frame following the frame including the index data. Accordingly, the indexer 4 switches from output of the first index data to output of the second index data one frame before the image signal generator 3 switches from the first page to the second page.

When the composite signal C output by the image signal generating unit 1 is received at an image display unit 2, the index detector 9 extracts the index signal X from the predetermined position in each frame. Although the index signal has been converted to a digital signal by the A/D converter 15 in the image signal receiving circuit 8, noise may have changed the values of the flag pixels, so that they are not necessarily the values (0, 255) set by the image signal generating unit 1. The index detector 9 accordingly slices the luminance scale at a certain threshold level, such as one hundred twenty-eight (128), considering values above the threshold level (129–255) to represent logical '1', and other values (0–128) to represent logical '0'. The index detector 9 supplies the index tester 11 with eight-bit index data ID representing the eight flag-pixel states.

Although the indexer 4 is shown in FIG. 7 as inserting the same index signal at two position in each frame, the index detector 9 only has to detect the index signal at one of these positions. Alternatively, the index detector 9 can detect both index signals, check that they agree, and disregard the index information if the index signals do not agree.

Of the eight bits supplied by the index detector 9, the index tester 11 tests the bit at the position corresponding to the unit number output by the unit number setting device 10. The frame selection signal FS is, for example, a binary signal having the value of the tested bit, '1' indicating that the next frame is selected, and '0' that the next frame is not selected.

If the frame selection signal FS indicates that the next frame is selected, then when this frame is output from the image signal receiving circuit 8, the frame selector 12 writes the image data Ds in the image memory 13. If the frame selection signal FS indicates that the next frame is not selected, the frame selector 12 does not write the image data in the image memory 13, the contents of which remain unchanged.

The image display hardware 14 reads the contents of the image memory 13 at predetermined timings to display whatever image is currently stored. If the frame selection signal FS remains in the non-select state for a while, the image display hardware 14 reads and displays the same image repeatedly.

In FIG. 10, for example, in the image display unit or units 2 selected by the flag pixels in the first index data, four consecutive frames of the first page are written into the image memory 13 and displayed by the image display hardware 14. The image display hardware 14 continues to read and display the fourth of these frames while pages two and three arrive, these pages not being stored in the image memory 13. The image display units 2 selected by the second and third index data operate similarly, storing and displaying the second and third pages, respectively. The image signal generating unit 1 switches from output of one page to another in, for example, a regular cyclic manner.

The first embodiment enables a single image signal generating unit 1 installed in, for example, a single expansion slot in a personal computer, and having only one cable connector, to display different images on different image display units 2. The number of different images that can be displayed is limited only by the number of available unit numbers, and not by the amount of expansion space available in the personal computer. Additional image display units 2 can be added easily to an existing configuration. Moreover, the image signal generating unit 1 uses a standard image signal format and does not require an expensive, high-speed D/A converter or other special facilities.

Figure 11:
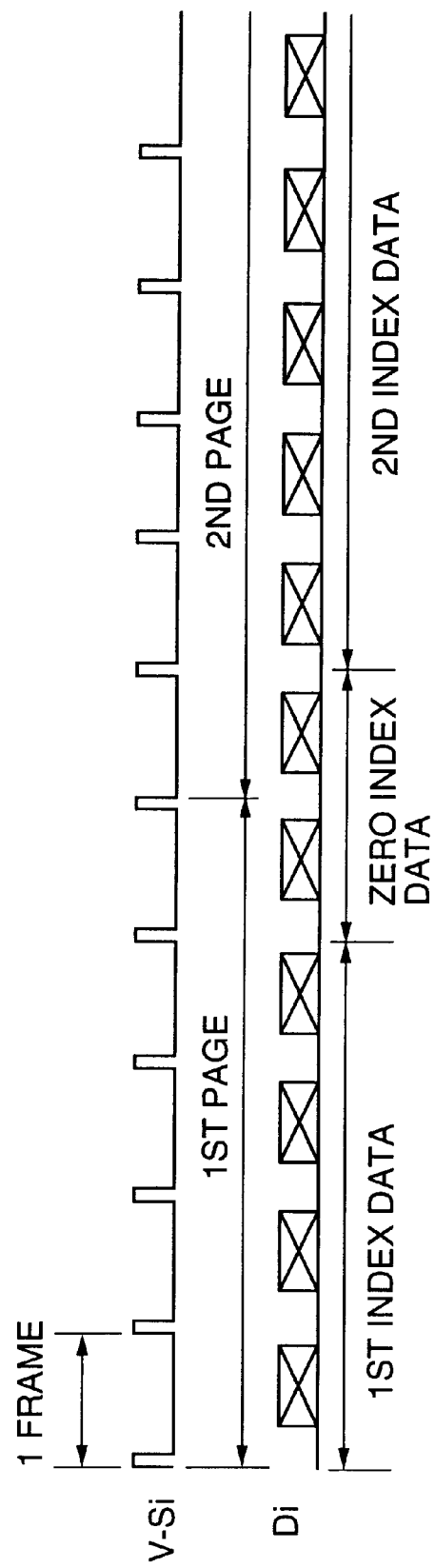
FIGS. 11 and 12 are timing diagrams illustrating the timing relationship between the index signal and pages of the image signal in two variations of the first embodiment.

FIG. 11 illustrates a variation of the first embodiment in which the image signal generating unit 1 outputs a zero index, comprising all-zero data with all flag pixels indicating the off-state, in at least two consecutive frames at each change of page, including the frames just before and after the page change. These two or more consecutive frames are not displayed by any image display unit 2. This variation is useful when the index signal is not accurately synchronized with the image signal. For example, when a spreadsheet program switches among the display of a plurality of tables, charts, and graphs, the exact timing relation between the image signal and the index signal may depend on whether the display is switched automatically by the program, or manually by the user. In this case, the all-zero index signals in FIG. 11 provide a useful safety margin, ensuring that each display appears only on the intended image display unit 2.

Figure 12:
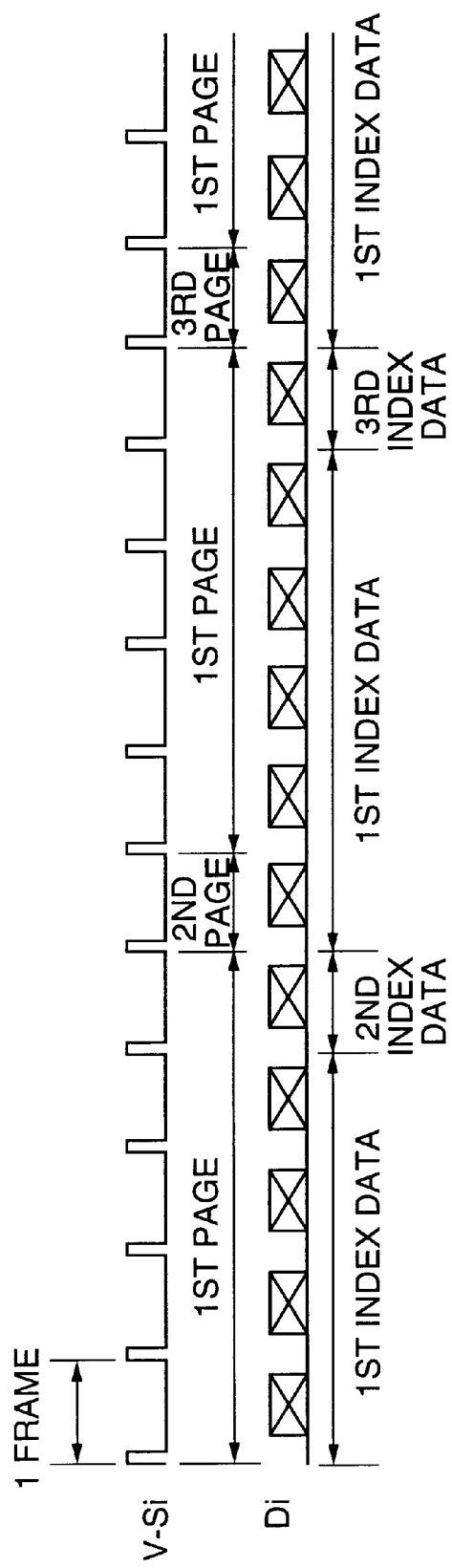

FIG. 12 illustrates another variation of the first embodiment, in which the image signal generating unit 1 outputs different pages for different durations of time. The first page is the main active page: for example, the page in which a cursor appears, or in which the pointer of a pointing device such as a mouse appears. The image signal generating unit 1 outputs this page nearly continuously, so that pointer movements and other user input are displayed promptly. The other pages are output only occasionally, briefly interrupting the output of the first page. The interruptions can be made short enough and infrequent enough so as not to be noticeable on the image display unit 2 displaying the first page. If output of the first page is interrupted for only one out every six frames, for example, cursor or pointer movement appears substantially continuous.

This variation is particularly useful when a single user uses all of the image display devices 2. The user can enter or edit text or perform other work on the first page in a normal manner, using one image display unit 2, while referring as necessary to other pages, which are displayed on other image display devices 2. The output frequency of the other pages can be adjusted according to the frequency with which these pages are updated.

Figure 13:
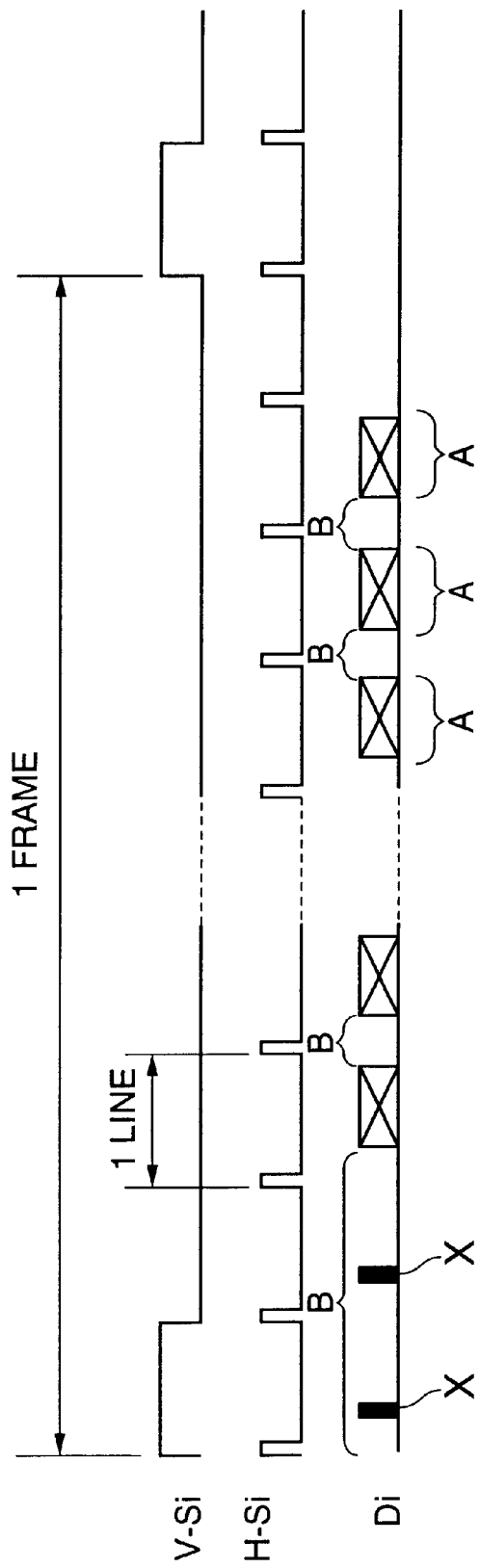
FIG. 13 is a timing diagram illustrating the position of the index signal in another variation of the first embodiment.

FIG. 13 illustrates another variation of the first embodiment, in which the index signal X is output during the vertical blanking interval of the image signal. The displayed image is output during the intervals marked A. The intervals marked B are non-display intervals. The vertical blanking interval comprises, in this example, two H-Si periods, referred to as horizontal intervals, at the beginning of the frame. The index signal X is output at predetermined positions in these two horizontal intervals.

Figure 14:
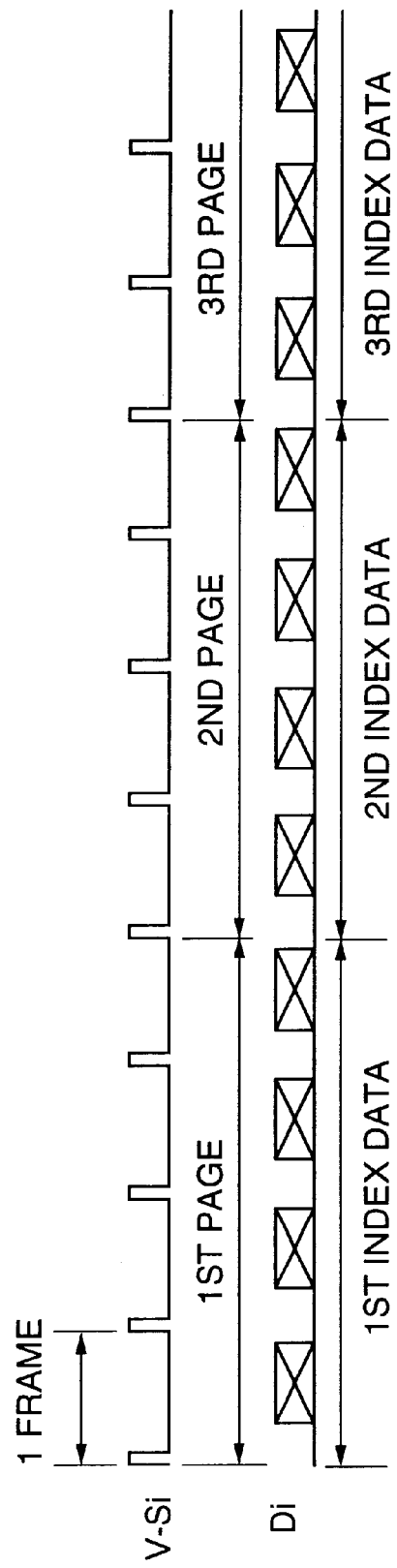
FIG. 14 is a timing diagram illustrating a possible timing relationship between the index signal and pages of the image signal in the variation in FIG. 13.

The image display unit 2 operates as described above, extracting the index signal from either of these two horizontal intervals. This variation has the advantage that the index signal does not actually appear on the display screen, so none of the visible display is lost. Furthermore, the index signal X may apply to the frame in which it is displayed, as shown in FIG. 14, instead of applying to the following frame.

Figure 15:
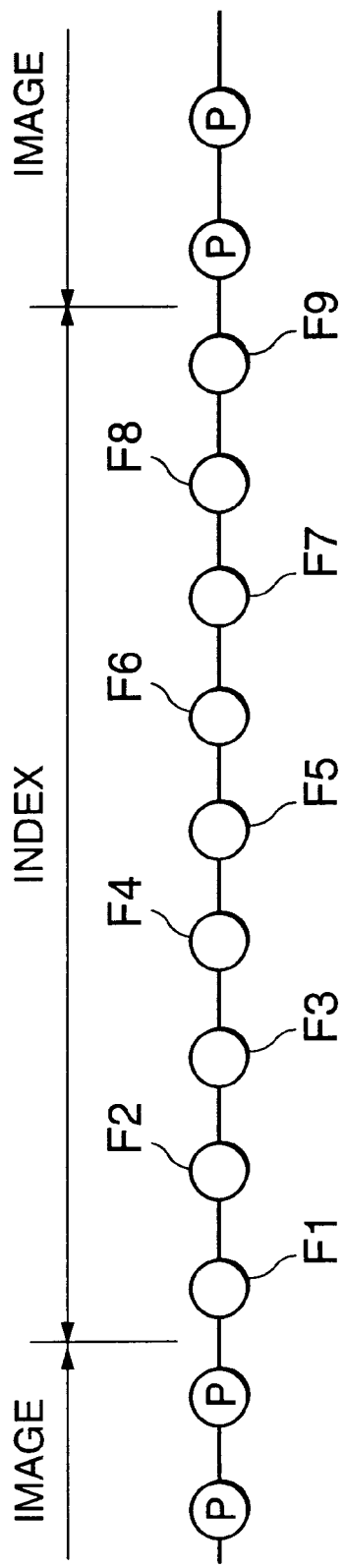
FIGS. 15, 16, and 17 illustrate the structure of the index signal in three more variations of the first embodiment.

FIG. 15 illustrates another variation of the first embodiment, in which the index signal includes check information for checking the validity of the unit-number designations. Specifically, the index signal includes a parity flag pixel FP in addition to the unit-number flag pixels F1 to F8 described above. The indexer 4 generates the value of the parity flag pixel FP by, for example, the following logic formula, in which E represents the logical exclusive-OR operation and F1 to F8 have values of logical '1' or '0'.

$$FP=((((((F1EF2)EF3)EF4)EF5)EF6)EF7)EF8)$$

The index detector 9 performs a similar calculation, and disregards the index information if there is a parity error; that is, if the calculated FP value does not match the actual FP value in the index signal. This variation provides a measure of protection from false index information that may be created if the index signal is corrupted by noise, or by movement of a mouse pointer over the index area on the display screen, or if the index signal is omitted from a frame. Upon detecting a parity error, the index detector 9 outputs all-zero index data, with all flags in the off-state, preventing the frame selector 12 from updating the image stored in the image memory 13. The image display hardware 14 continues to display the existing image in the image memory 13.

In a further variation of this variation, when the index detector 9 detects a parity error, it outputs all-one index data, with all flag pixels in the on-state, so that the relevant frame is displayed by all image display devices 2.

Figure 16:
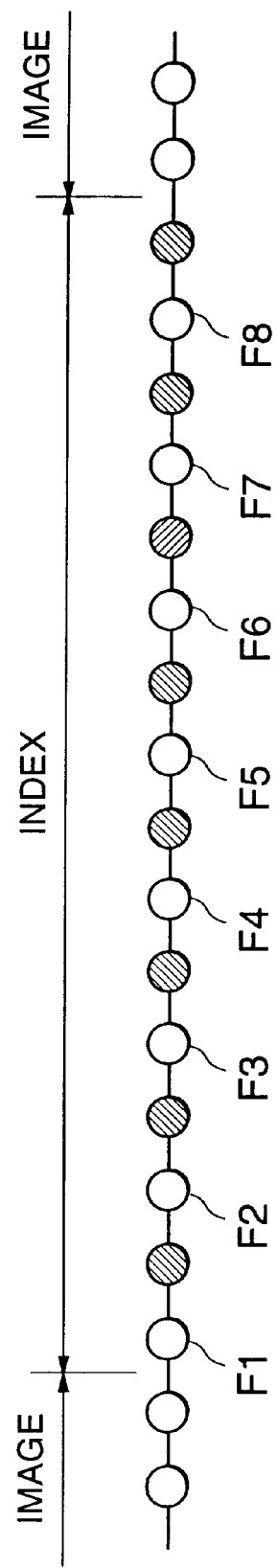

FIG. 16 illustrates another variation of the first embodiment, in which the indexer 4 generates a check pixel (indicated by hatching) for each of the eight flag pixels F1 to F8. The value of each check pixel is, for example, the logical complement of the value of the immediately preceding flag pixel. The index detector 9 compares each check pixel with the preceding flag pixel. If any check pixel has an incorrect value, the index detector 9 disregards the entire index signal, generating all-zero or all-one index data in place of the received index data. Alternatively, the index detector 9 does not disregard the entire check signal, but sets each flag pixel having an incorrect check pixel to the off-state. Compared with FIG. 15, the variation in FIG. 16 provides stronger error protection and more flexibility in dealing with errors.

In another variation of the first embodiment, the index detector 9 operates with two threshold levels, positioned at, for example, the three-fourths point and one-fourth point (192 and 63) of the luminance scale. Flag values equal to or greater than the upper threshold are recognized as logical '1'. Flag values equal to or less than the lower threshold are recognized as logical '0'. Other flag values are disregarded as ambiguous. This variation also provides protection against errors.

Figure 17:
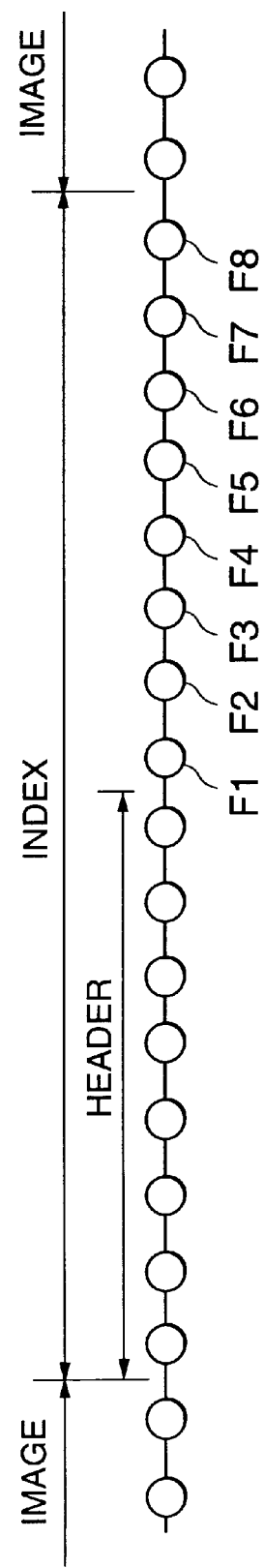

FIG. 17 illustrates still another variation of the first embodiment, in which the index signal X includes a header preceding the flag pixels F1 to F8. The header comprises, for example, eight pixels with a fixed pattern of logical '1's and '0's. The index detector 9 disregards index signals not having a correct header, generating all-zero or all-one index data in place of the received index data. This variation also provides error protection, and enables the index detector 9 to distinguish between frames having index signals and frames lacking index signals. In addition, since the index detector 9 can identify the index signal from the header, the index signal does not have to be located at a precise position in the image signal. The index detector 9 can extract the index signal from an arbitrary position in the image signal. The timing precision requirements of the indexer 4 are relaxed accordingly.

In a further variation of this variation, the header also includes a variable pattern of, for example, eight pixels designating the threshold level to be used in distinguishing logical '0' from logical '1' in the flag pixels. The indexer 4 can then select a threshold level suitable for the output level of the image signal.

The number of flag pixels in the first embodiment is not limited to eight. The index signal may have an arbitrary number of flag pixels, to accommodate an arbitrary number of image display units 2.

The index signal does not have to comprise a consecutive sequence of horizontally adjacent pixels. The index signal may be a sequence of vertically adjacent pixels, disposed on the right or left edge of the screen, for example. The pixels constituting the index signal may also be disposed in a two-dimensional pattern.

In the examples shown above, the index signal had double redundancy, the same index signal being inserted in two horizontal scanning lines, but a higher level of redundancy can be used. If the same index signal is inserted more than twice per frame, the index detector 9 can use a majority-decision rule to resolve conflicts in the index data, thereby providing an error-correction capability.

If the image signal is an RGB color signal with red, green, and blue components, the indexer 4 may insert the same index signal in each of these components separately. Alternatively, the indexer 4 may insert the index signal into two of the components as a differential signal. For example, the indexer 4 can encode a logical '1' by setting the red component to the maximum luminance level and the blue component to the minimum luminance level, and encode a logical '0' by setting the red component to the minimum luminance level and the blue component to the maximum luminance level. The index detector 9 recognizes a logical '1' when the red level exceeds the blue level, and a logical '0' when the blue level exceeds the red level. In effect, this system doubles the amplitude of the index signal and thereby reduces the likelihood of error.

As another alternative, when the image signal is an RGB signal, the indexer 4 may place the flag values of the index signal in one color component, and use another color component to designate the threshold level to be used by the index detector 9. The indexer 4 can then adjust the amplitude and level of the index signal to make the index signal less conspicuous in the image signal.

The flag values do not have to be binary values. The necessary number of flag pixels can be reduced by providing the index detector 9 with multiple threshold values, which are used to distinguish among three or more luminance levels set by the indexer 4.

The indexer 4 need not be a hardware circuit. The index signal can be added to the image signal by software running on the personal computer, by writing the index signal values into a buffer in which the image signal is stored in digital form, before the image signal is converted to an analog signal. The indexer 4 then becomes part of a system software facility for managing multiple pages.

Figure 18:
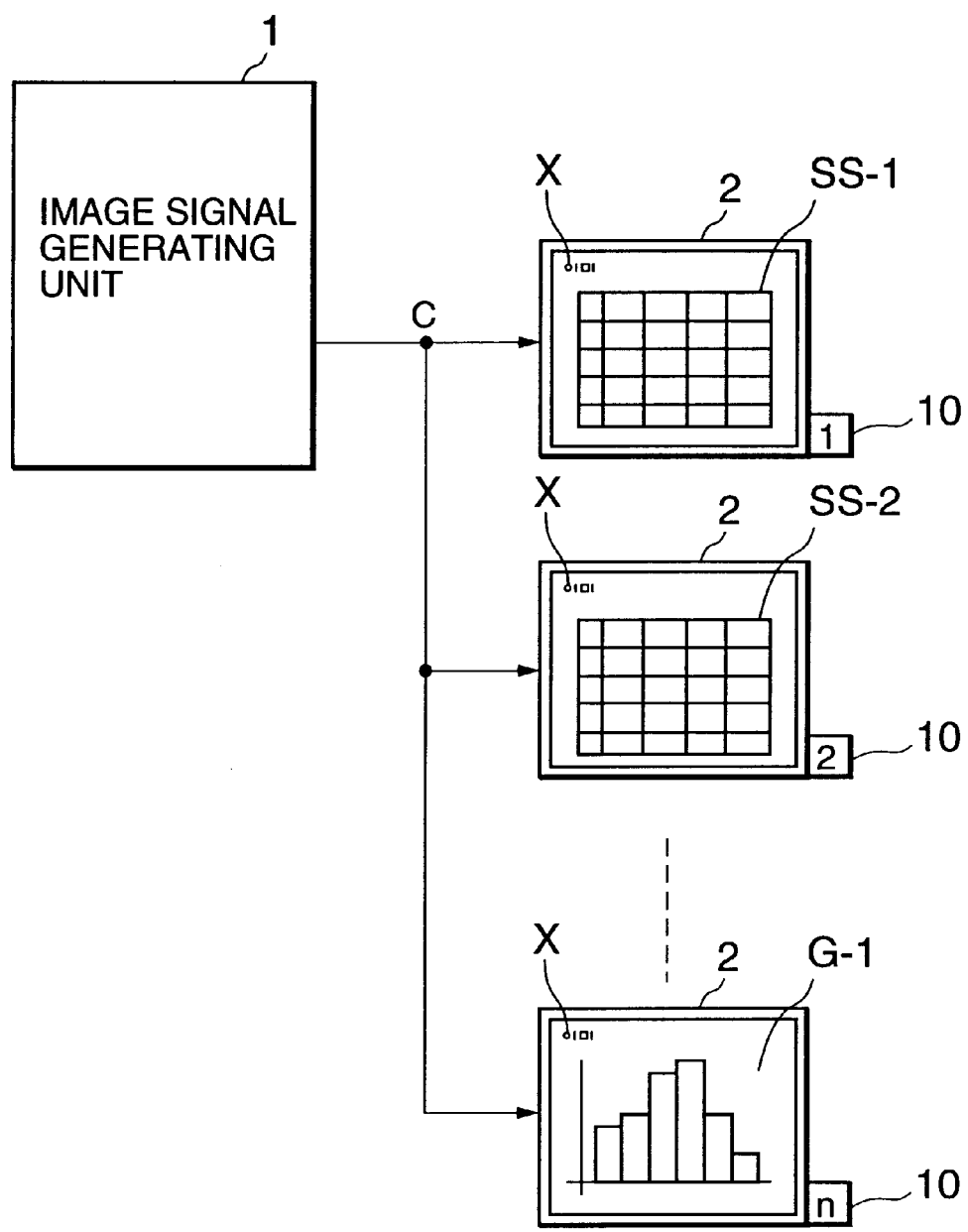
FIG. 18 illustrates the display of multiple pages produced by a single application program in the first embodiment.

Different pages need not be generated by different application programs. FIG. 18 shows an example in which a single spreadsheet application program generates a plurality of spreadsheets (SS-1, SS-2, . . . ) and a graph (G-1), which are displayed as separate pages by different image display units. Each time the application program updates one of the spreadsheets or graphs, the indexer 4 generates an index signal designating the image display unit 2 on which the updated spreadsheet or graph is to be displayed. At other times, the indexer 4 generates an index signal indicating the image display device 2 displaying the spreadsheet or graph in which a cursor or pointer is currently located. The user can manipulate data on one spreadsheet while referring to data shown in other spreadsheets or graphs, simply by shifting his or her gaze from one image display unit 2 to another.

In a conventional personal computer system these multiple spreadsheets and graphs would be displayed one at a time on the same display screen, and the user would be have to perform manual operations to switch from one display to another. Alternatively, the spreadsheets and graphs might be displayed simultaneously in separate windows on a single screen, but at a reduced size, making the displayed information hard to see, or in cluttered manner, with some windows partially or completely hidden behind other windows.

Figure 19:
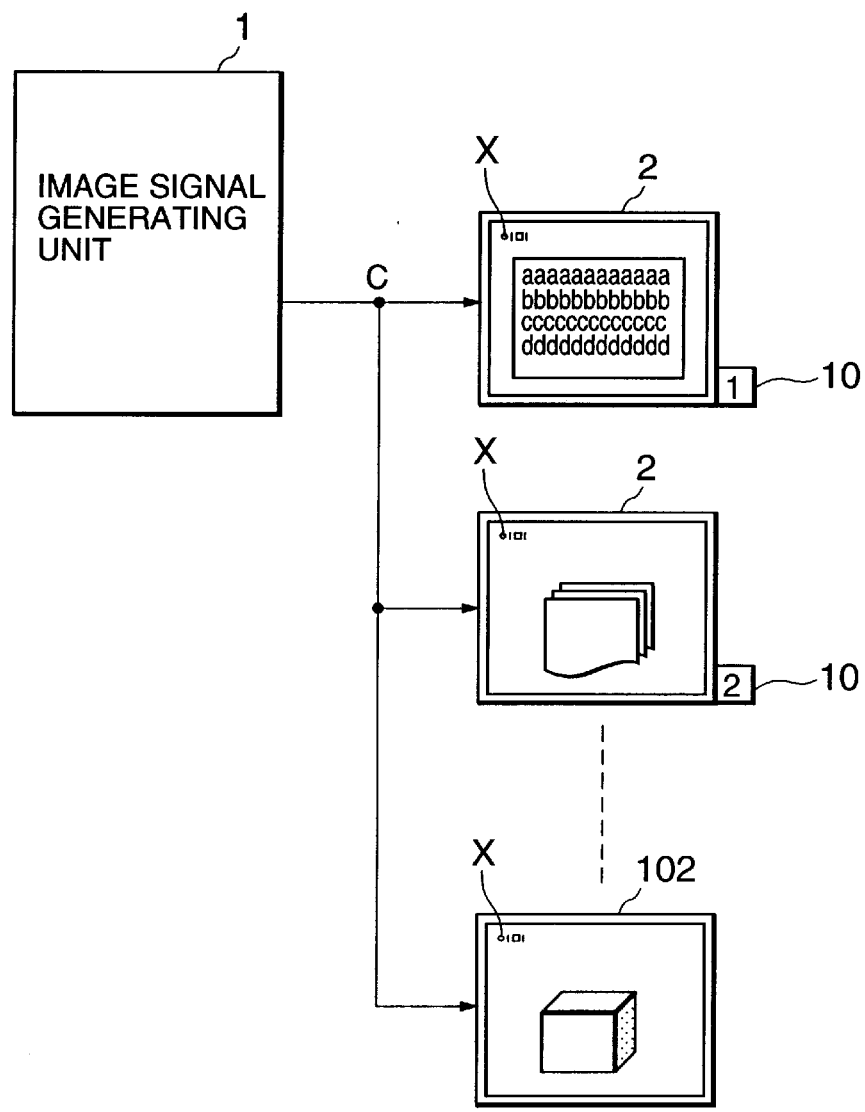
FIG. 19 illustrates the configuration of image display units in a further variation of the first embodiment.

FIG. 19 illustrates a further variation of the first embodiment, in which the image signal generating unit 1 is coupled to one or more image display units 2 of the invented type, and to a conventional image display unit 102. The conventional image display unit 102 displays each frame output by the image signal generating unit 1, regardless of the value of the index signal X. The other image display units 2 display only the frames selected by the index signal X, according to their unit numbers N. The user uses the conventional image display unit 102 as a work display, for entering or editing text, images, and other data, and uses the other image display units 2 to display reference information, which is not currently being edited.

Next, a second embodiment will be described, in which the image signal generating unit 1 outputs a digital composite signal C.

In the image signal generating unit 1 in the second embodiment, the image signal generator 3 generates a digital image signal. The indexer 4 rewrites the values of the pixels constituting the index signal in each frame. The image signal output unit 5 outputs the image signal, with the index information added by the indexer 4, in digital form, together with a clock signal and horizontal and vertical synchronizing signals. The image signal output unit 5 may also output a separate synchronizing signal indicating the location of the index signal. The image signal and synchronizing signals output by the image signal output unit 5 constitute the composite signal C that is transmitted from the output terminal 6 of the image signal generating unit 1 to the input terminal 7 of each image display unit 2.

Figure 20:
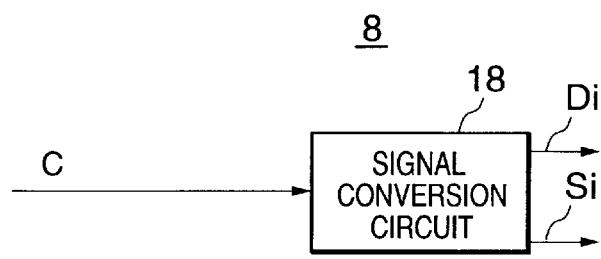
FIG. 20 is a block diagram showing the internal structure of the image signal receiving circuit in a second embodiment.

Each image display unit 2 has substantially the same configuration as in the first embodiment, illustrated in FIG. 5, but the internal structure of the image signal receiving circuit 8 is simplified. Referring to FIG. 20, the image signal receiving circuit 8 now comprises a signal conversion circuit 18 that separates the digital composite signal C into an image signal Di and a synchronizing signal Si. The signal conversion circuit 18 may also convert the signal voltage levels.

Aside from using digital instead of analog signals, the second embodiment operates in the same way as the first embodiment, and achieves the same effects. A detailed description of the operation of the second embodiment will be omitted.

Figure 21:
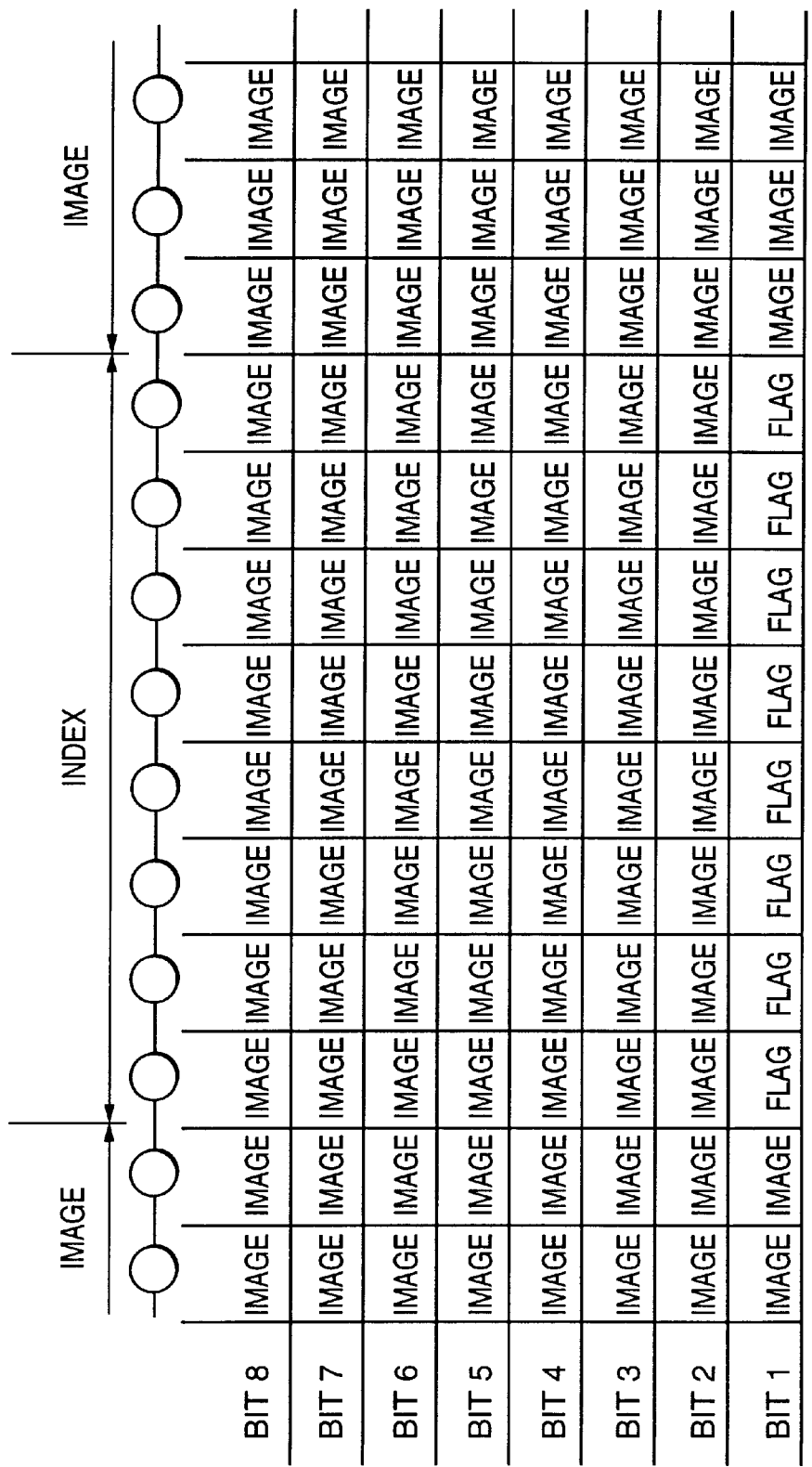
FIGS. 21 and 22 illustrate the structure of the index signal in variations of the second embodiment.

In a variation of the second embodiment, the index signal is disposed in the least significant bits (bit 1) of eight consecutive pixels in one horizontal scanning line, as shown in FIG. 21. These eight bits are flag bits, the '0' and '1' values of which have the same meaning as the '0' and '1' logical values of the flag pixels F1 to F8 in the first embodiment. The indexer 4 adds the index signal to the image signal by setting or clearing these eight flag bits. The seven more significant bits of each pixel in the index signal interval (bits 2–8) retain unaltered image information.

The index detector 9 examines only the least significant bits of the eight pixels in the index signal interval, obtaining the index data ID as the values of these bits. This variation also achieves the same effects as the first embodiment, but makes the index signal less conspicuous, because the indexer 4 changes only the least significant bit. Normally, the user will not notice the presence of the index signal. Almost none of the displayed image information is lost.

If the image signal is an RGB color signal, the indexer 4 writes the index information in the least significant bits of just one color component, such as the red component. The index signal then becomes even less conspicuous.

Although the least significant bit is the preferred location of the index signal, the eight-bit index signal can also be coded as, for example, the eight bits of a single pixel, or in various other ways.

Figure 22:
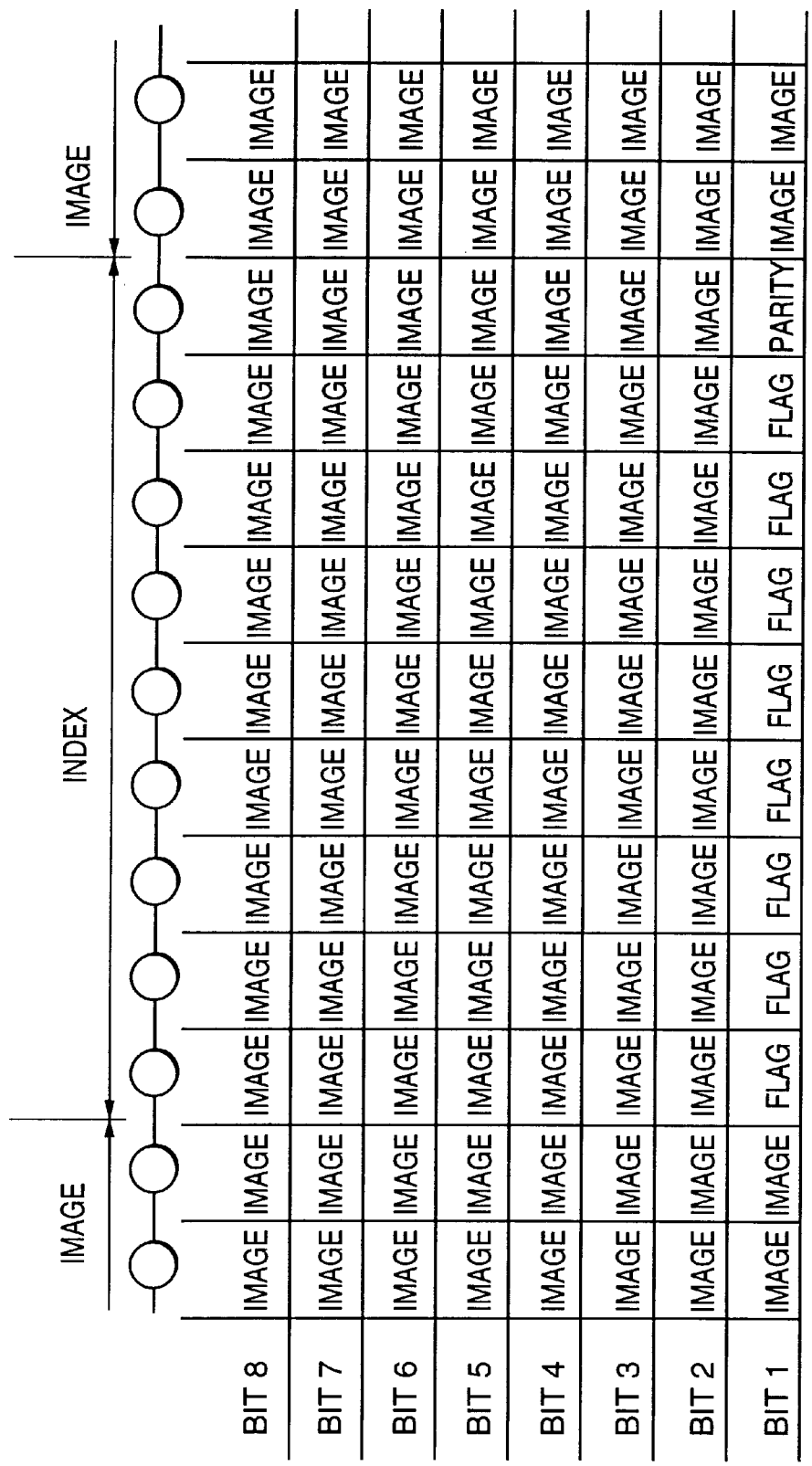

Referring to FIG. 22, the index signal may also include a parity bit, providing a measure of protection from errors introduced by motion of a mouse pointer over the index-signal area, for example, and from the misinterpretation of non-existent index information in frames lacking index signals.

Figure 23:
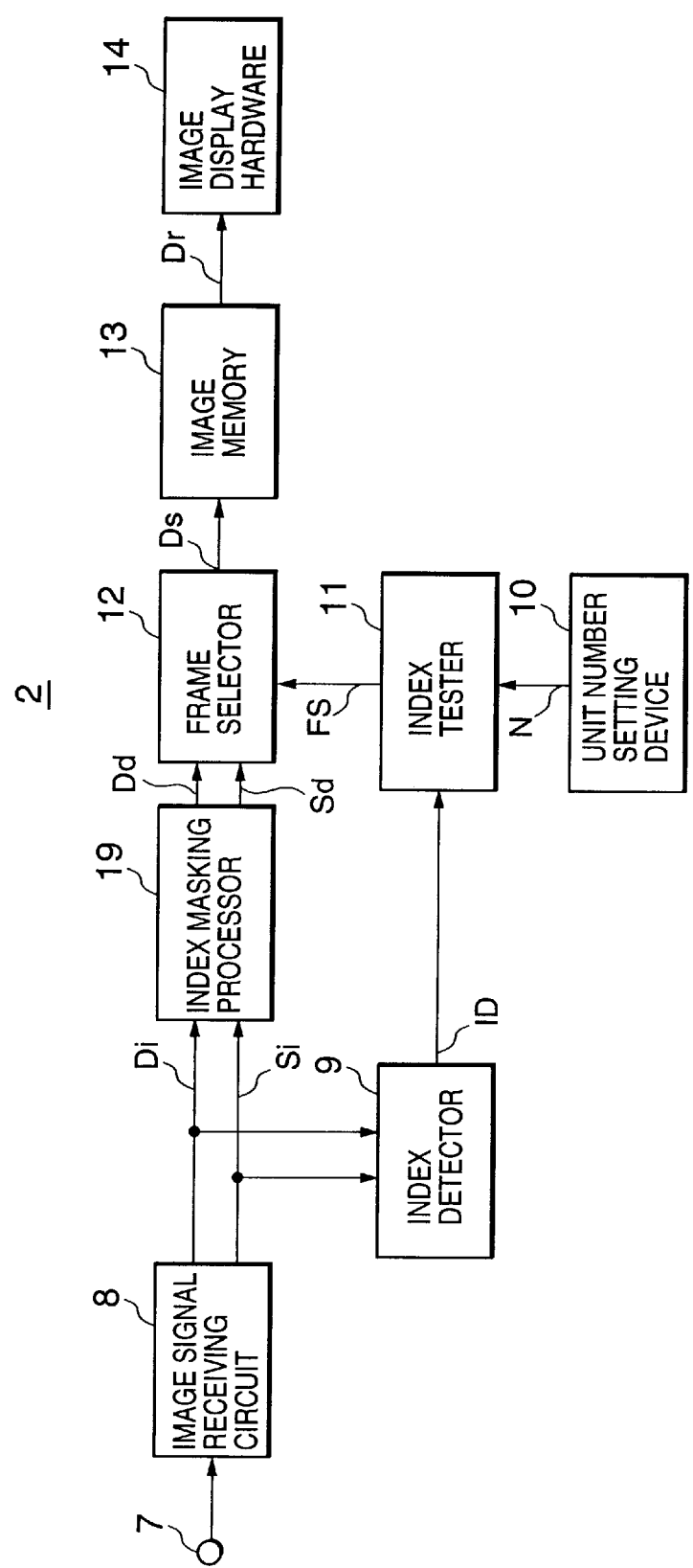
FIG. 23 is a block diagram showing the internal structure of an image display unit in another variation of the second embodiment.

Referring to FIG. 23, the image display units 2 in the second embodiment may also comprise an index masking processor 19 disposed between the image signal receiving circuit 8 and frame selector 12. The index masking processor 19 receives the image signal Di and synchronizing signal Si from the image signal receiving circuit 8, and sets the bits constituting the index part of the image signal Di to predetermined values. For example, the index masking processor 19 clears the eight flag bits in FIG. 21, or the eight flag bits and the parity bit in FIG. 22, to zero. The index masking processor 19 supplies the resulting image signal Dd to the frame selector 12, together with a synchronizing signal Sd substantially identical to the received synchronizing signal Si. By replacing the index data with, for example, uniform zero bits, the index masking processor 19 makes the index signal still less visible.

Next, a third embodiment will be described.

Figure 24:
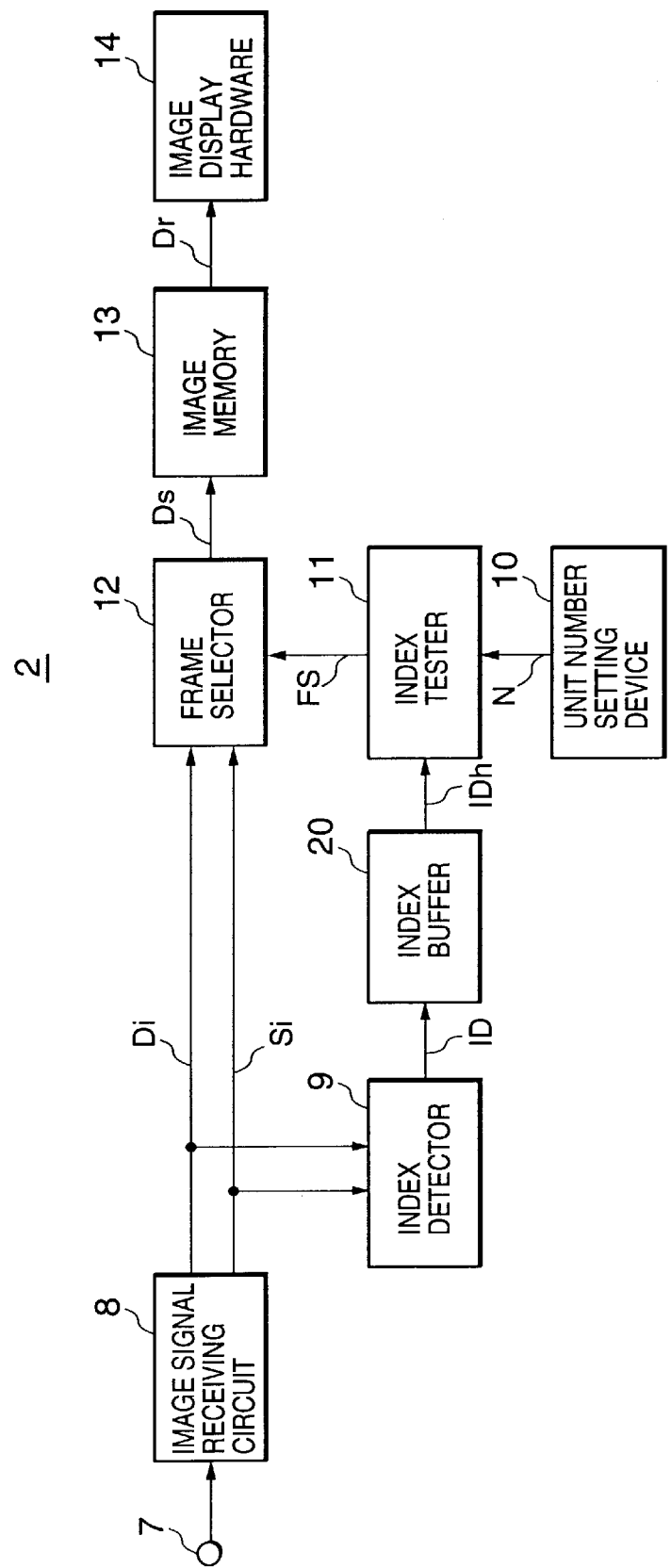
FIG. 24 is a block diagram showing the internal structure of an image display unit in a third embodiment.

Referring to FIG. 24, the configuration of the image display units 2 in the third embodiment includes an index buffer 20, in addition to the elements described in the first embodiment. The index buffer 20 receives the index data ID from the index detector 9, stores the index data, and supplies the stored index data IDh to the index tester 11.

Figure 25:
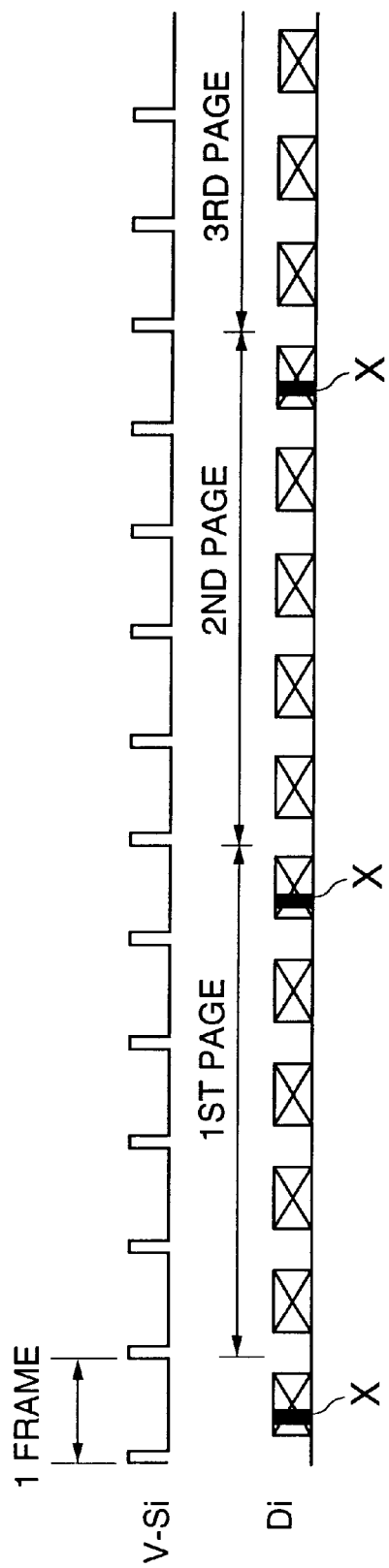
FIG. 25 is a timing diagram illustrating the operation of the third embodiment.

The operation of the third embodiment is generally similar to the operation of the first embodiment, but the indexer 4 in the image signal generating unit 1 adds an index signal X only to the frame immediately preceding each new page, as shown in FIG. 25. The index signal includes a header, as shown in FIG. 17.

In the image display unit 2, the index detector 9 recognizes the index signal by its header, and outputs the index data ID to the index buffer 20. The index buffer 20 supplies the index data to the frame selector 12, and continues to supply the same index data IDh once per frame, until another index signal is received from the image signal generating unit 1.

In the third embodiment, since the index signal appears in comparatively few frames, its visibility is reduced, and the amount of image information lost due to replacement by the index signal is also reduced.

Another effect of the third embodiment is that if an index signal is corrupted by noise or mouse-pointer interference, and cannot be recognized by the image display units 2, the page to which the index signal pertains is displayed by the same image display unit 2, or group of image display units 2, that displayed the preceding page, instead of being displayed by all or none of the image display units 2.

Next, a fourth embodiment will be described.

Figure 26:
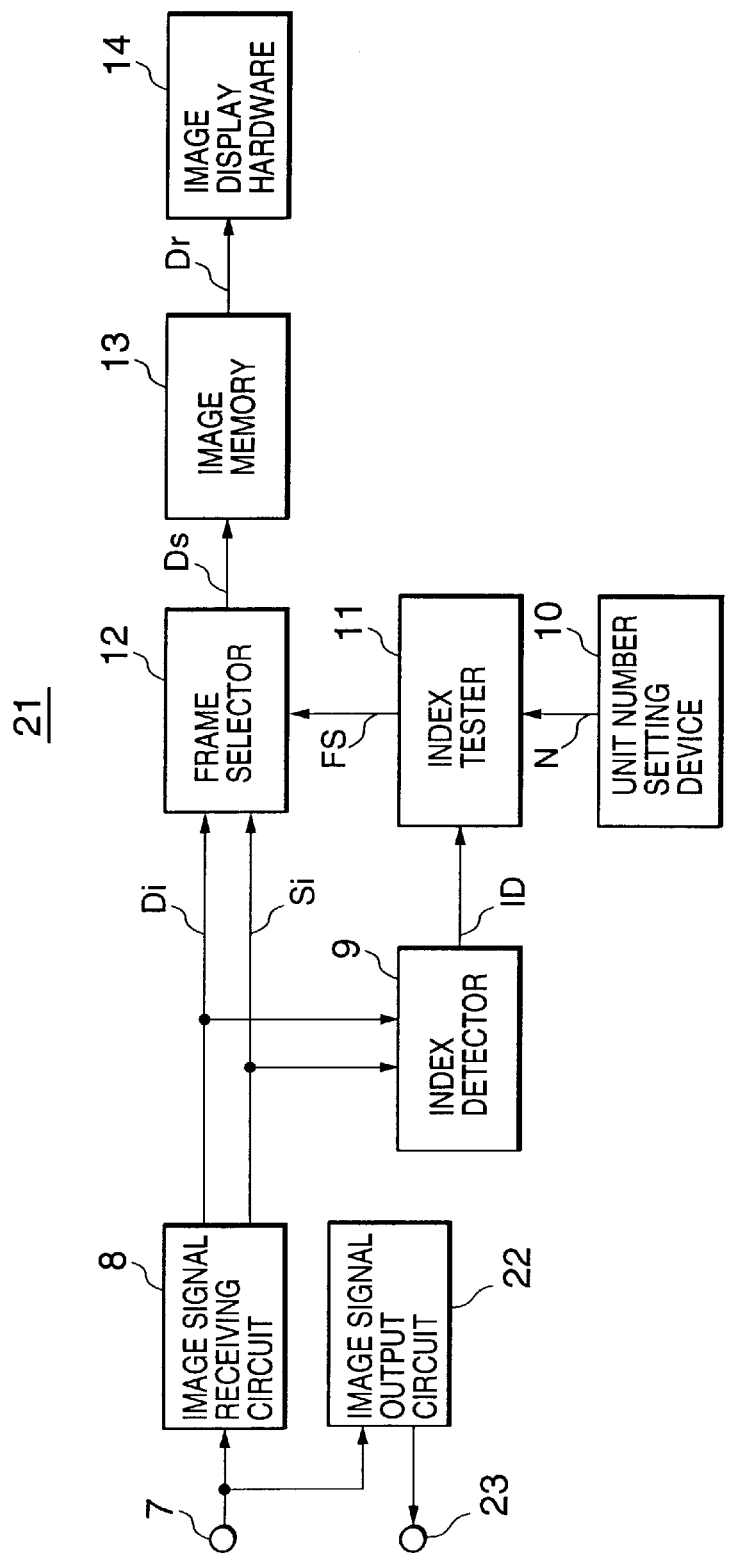
FIG. 26 is a block diagram showing the internal structure of an image display unit in a fourth embodiment.

Referring to FIG. 26, each image display unit 21 in the fourth embodiment has an image signal output circuit 22, in addition to the elements described in the first embodiment. The image signal output circuit 22 receives the composite signal C from the input terminal 7, and outputs the same composite signal C at an output terminal 23.

Figure 27:
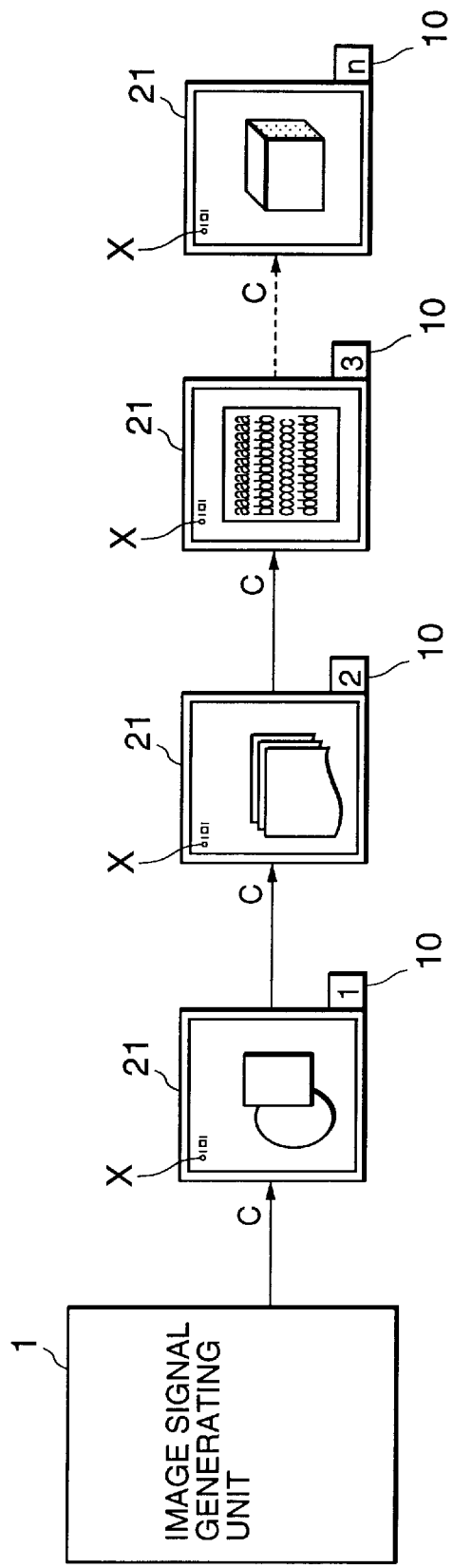
FIG. 27 illustrates the system configuration of the fourth embodiment.

Referring to FIG. 27, the image display units 21 are coupled in a chained fashion, the output terminal 23 of each image display unit being connected by a cable to the input terminal 7 of the next image display unit. The composite signal C output from the image signal generating unit 1 is supplied to the input terminal 7 of the first image display unit 21, then passed from one image display unit to the next until the last image display unit is reached. Frames of the composite signal are displayed selectively by each image display unit 21 according to its unit number N, as described in the first embodiment.

Aside from the different connection configuration, the fourth embodiment operates in the same way as the first embodiment, so a detailed description will be omitted.

Figure 28:
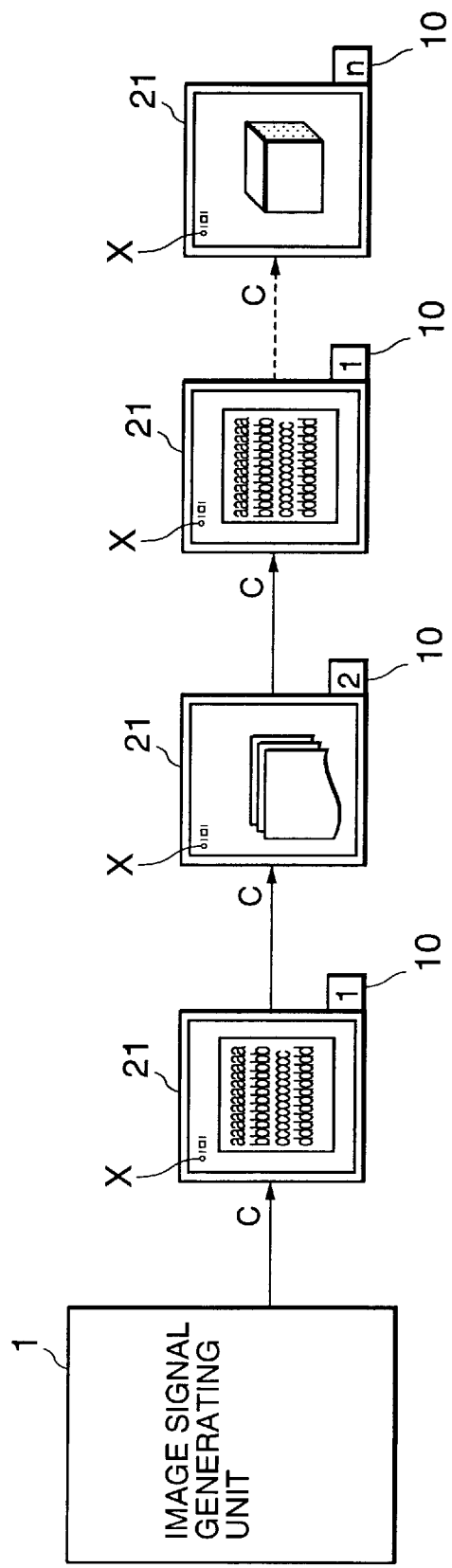
FIG. 28 illustrates an alternate assignment of unit numbers in the fourth embodiment.

As in the first embodiment, the image display units 21 need not have different unit numbers. FIG. 28 shows an example in which unit number one is set in the unit number setting devices 10 of two image display units 21, which both display the same page.

In a variation of the fourth embodiment, the composite signal C is a digital signal, as in the second embodiment.

In another variation, the index signal is added to the image signal only when the page is changed, as in the third embodiment.

Figure 29:
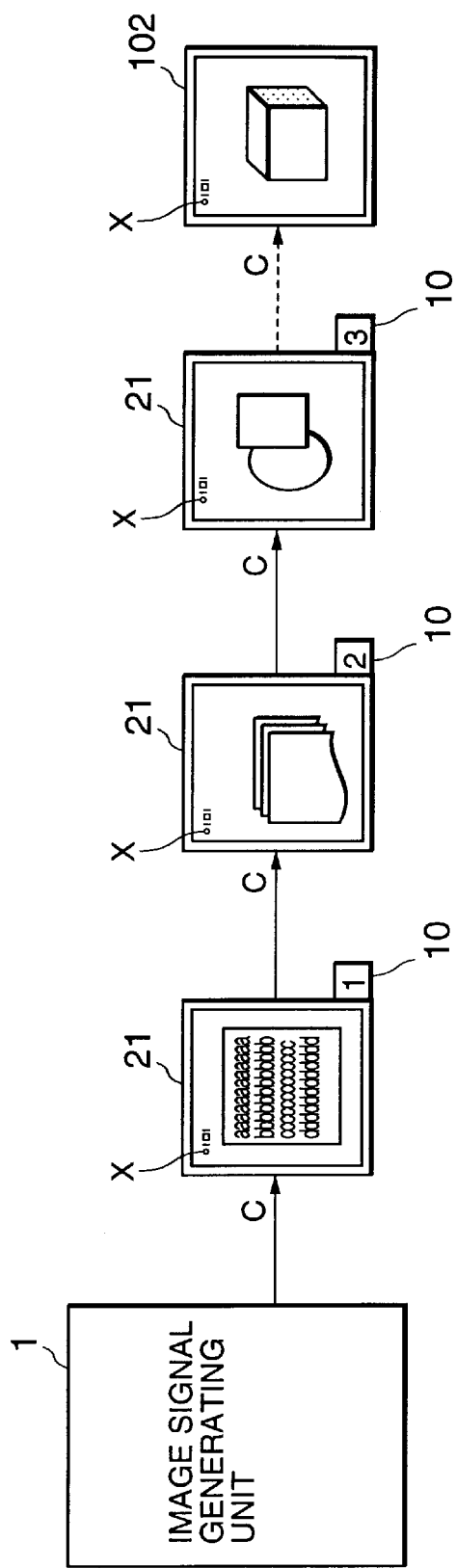
FIG. 29 illustrates the system configuration of a variation of the fourth embodiment.

In another variation of the fourth embodiment, the last image display unit in the chain is a conventional image display unit 102, as shown in FIG. 29. The conventional image display unit 102, which displays every page output by the image signal generating unit 1, is used for input and editing work. The other image display units 21 are used to display reference pages.

Figure 30:
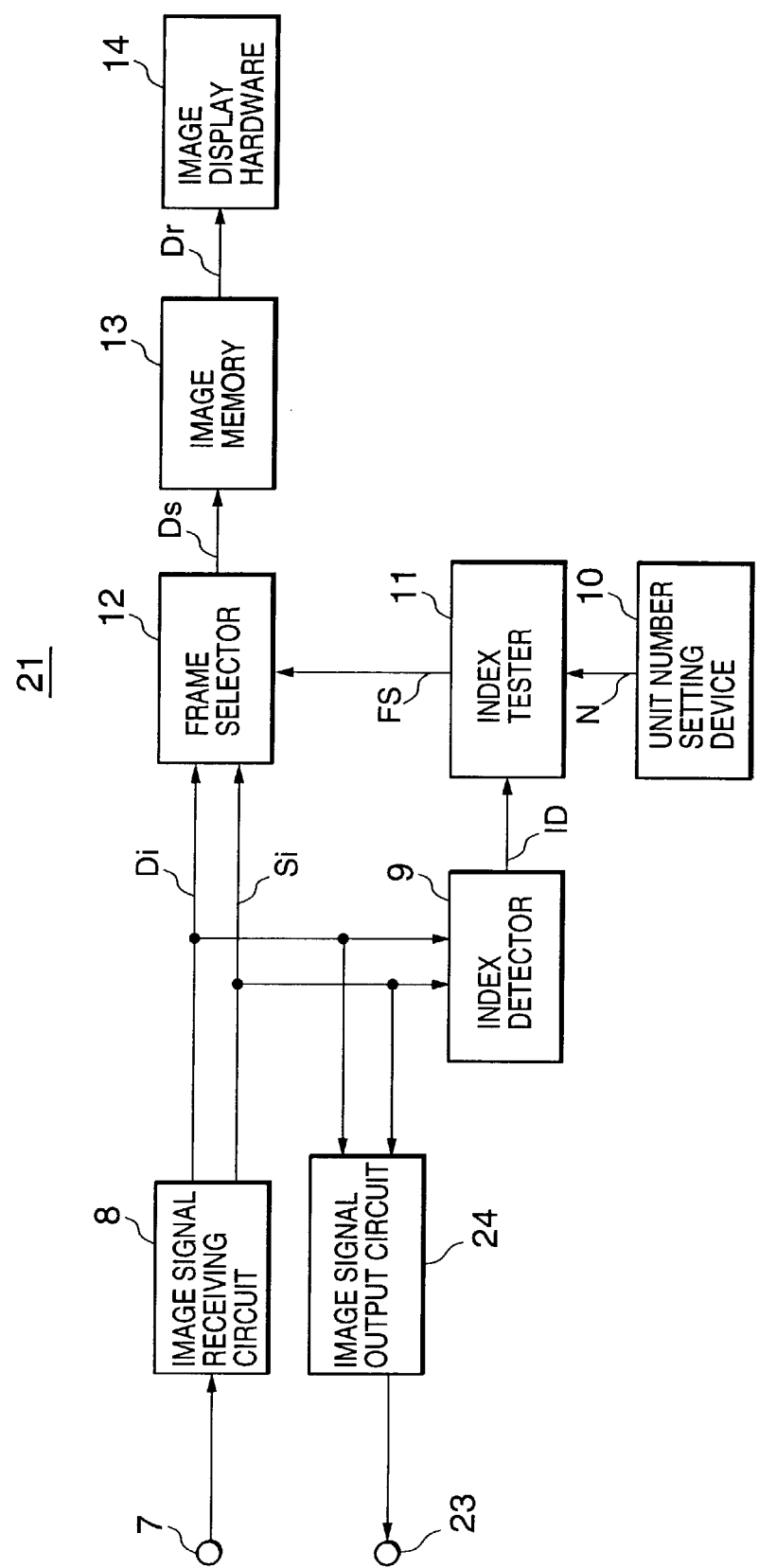
FIG. 30 is a block diagram showing the internal structure of an image display unit in another variation of the fourth embodiment.

In yet another variation of the fourth embodiment, shown in FIG. 30, the image signal output circuit 24 in each image display unit 21 receives the digital image signal Di and synchronizing signal Si from the image signal receiving circuit 8, instead of receiving the composite signal C from the input terminal 7. The image signal output circuit 24 regenerates the composite signal C from the image signal Di and synchronizing signal Si, and supplies the regenerated composite signal C to the output terminal 23.

The variation in FIG. 30 is useful in systems employing, for example, low-voltage differential signaling (LVDS) or transition-minimized differential signaling (TMDS). The composite signal C in these systems is typically a digital RGB color signal in which the red, green, and blue components have eight bits each. The pixel rate is typically about one hundred megahertz (100 MHz). Output of the red, green, and blue components and the synchronizing signal at a clock rate equal to the pixel rate would require a separate signal line for each bit. Including ground return lines, the interconnecting cable would have to have more than twenty-five conductors. To reduce the cable size, the clock rate is usually increased by a factor of four or more, reducing the number of parallel bits by a similar factor. The cable then requires only a few signal lines, but the combination of a high clock rate (400 MHz or more) and a low voltage swing (0.3 $V_{p-p}$ in the LVDS system, for example) makes the signals vulnerable to distortions caused by reflection, which occurs because of impedance mismatching.

Accumulation of such distortions as the composite signal C propagates from one image display unit 21 to the next could make the signal waveforms unrecognizable by the time the last image display unit is reached. By regenerating the composite signal C from the image signal Di and synchronizing signal Si, which have comparatively large voltage swings, the image signal output circuit 24 prevents the accumulation of distortion, enabling the image signal receiving circuit 8 in each image display unit 21 to receive the signal correctly. An unlimited number of image display units 21 of the type shown in FIG. 30 can thus be coupled without problems of signal degradation.

Next, a fifth embodiment will be described.

Figure 31:
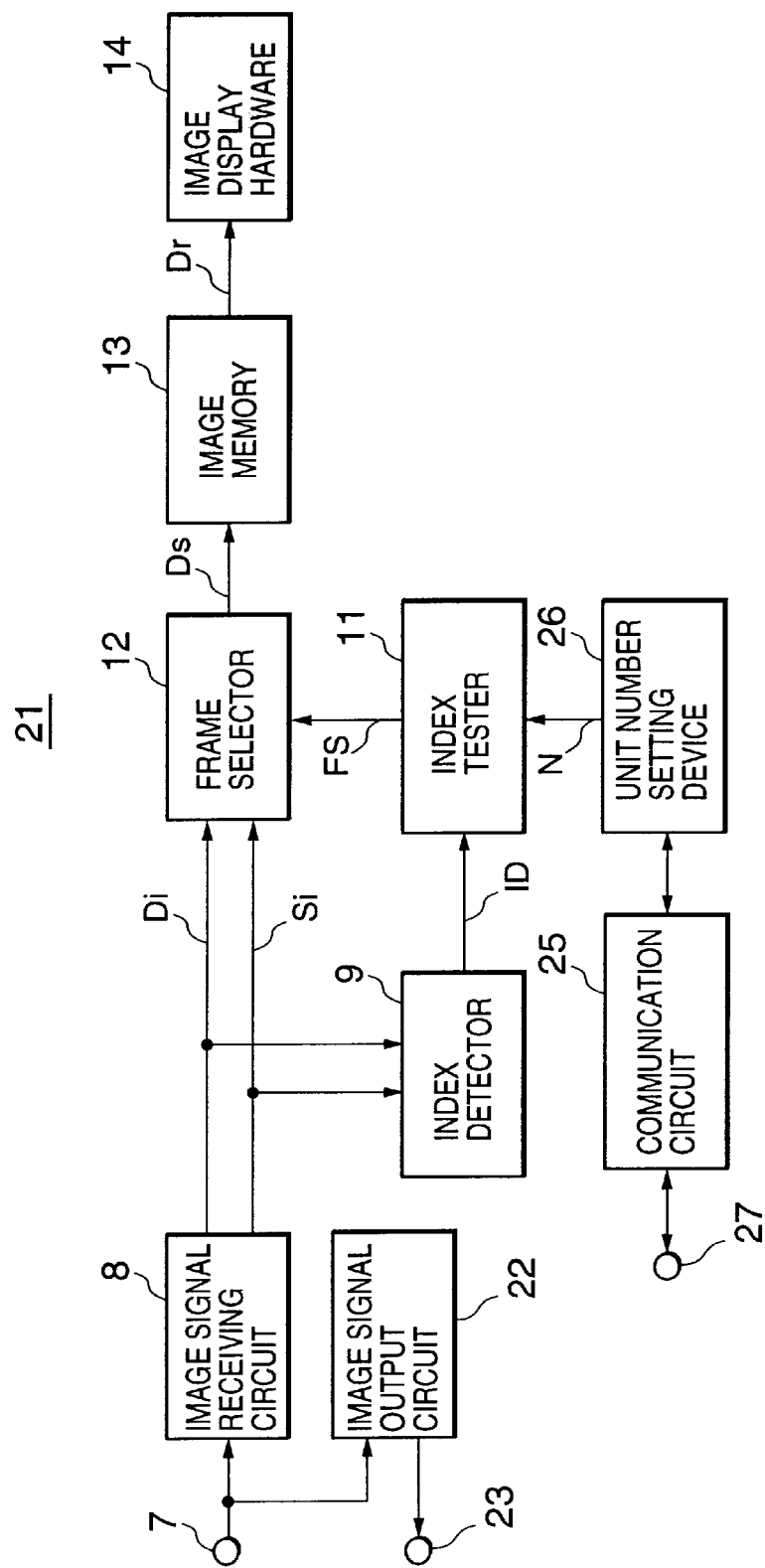
FIG. 31 is a block diagram showing the internal structure of an image display unit in a fifth embodiment.

Referring to FIG. 31, the fifth embodiment adds a communication circuit 25 to the configuration of the image display units 21 in the fourth embodiment, and alters the unit number setting device 26. Instead of being a manually set device such as a DIP switch, the unit number setting device 26 is an arithmetic or logic circuit that sets the unit number N of the image display unit 21 according to information received from the communication circuit 25. The communication circuit 25 is linked through an input-output port 27 to the communication circuits 25 in other image display units 21. The input-output ports 27 in different image display units 21 are interconnected by, for example, electrical cables in a bus configuration.

By communicating with one another through the communication circuits 25, the unit number setting devices 26 in different image display units 21 automatically select unit numbers according to a predetermined rule. As one example of the rule, the unit number is set to one in the image display unit 21 coupled to the image signal generating unit 1, and increases by one in each successive image display unit 21 in the chain.

The fifth embodiment enables the user to add image display units without having to set their unit numbers manually.

Next, a sixth embodiment will be described.

Figure 32:
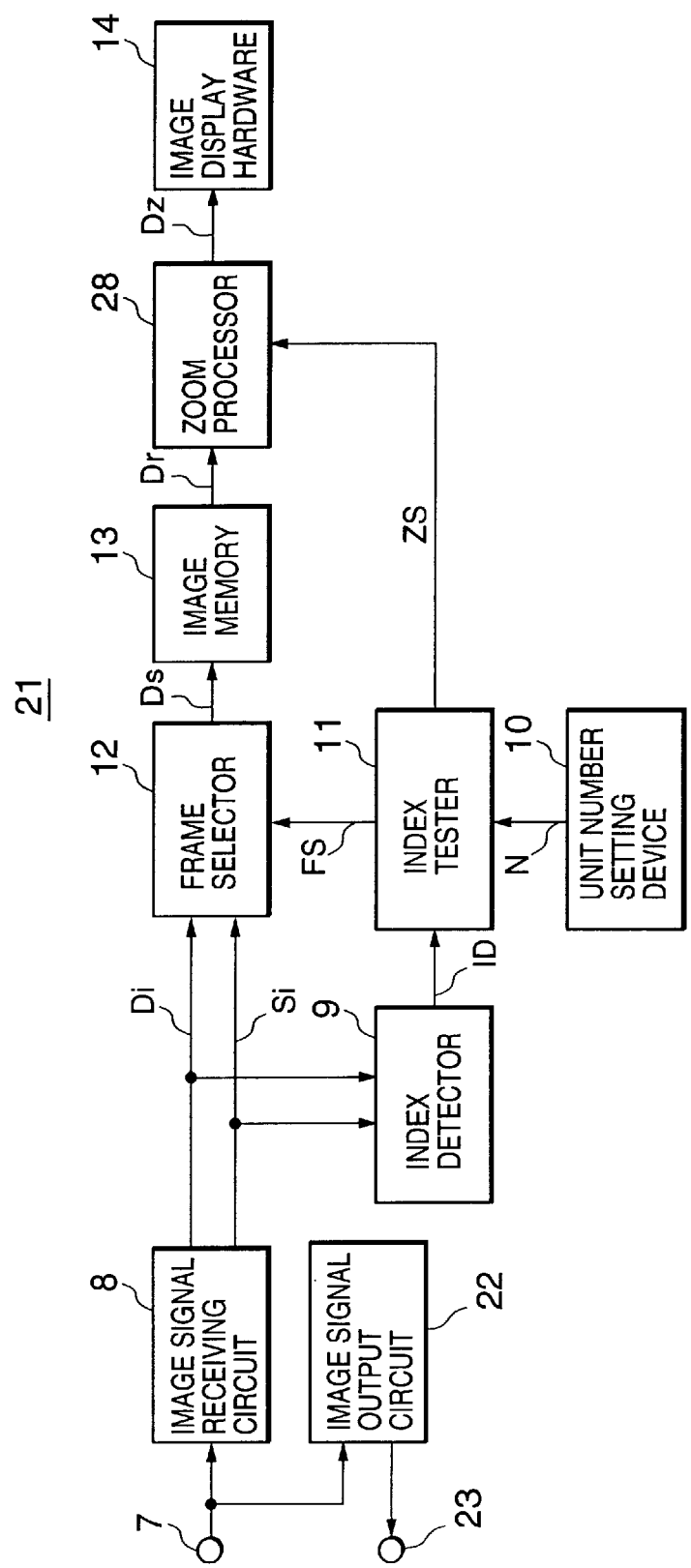
FIG. 32 is a block diagram showing the internal structure of an image display unit in a sixth embodiment.

Referring to FIG. 32, the sixth embodiment adds a zoom processor 28 to the configuration of the image display unit 21 in the fourth embodiment. Responding to a zoom control signal ZS from the index tester 11, the zoom processor 28 reads an arbitrary part of the image data Dr stored in the image memory 13, expands this arbitrary part by an arbitrary zoom ratio, and supplies the expanded image Dz to the image display hardware 14. The image display hardware 14 displays the expanded image Dz.

Figure 33:
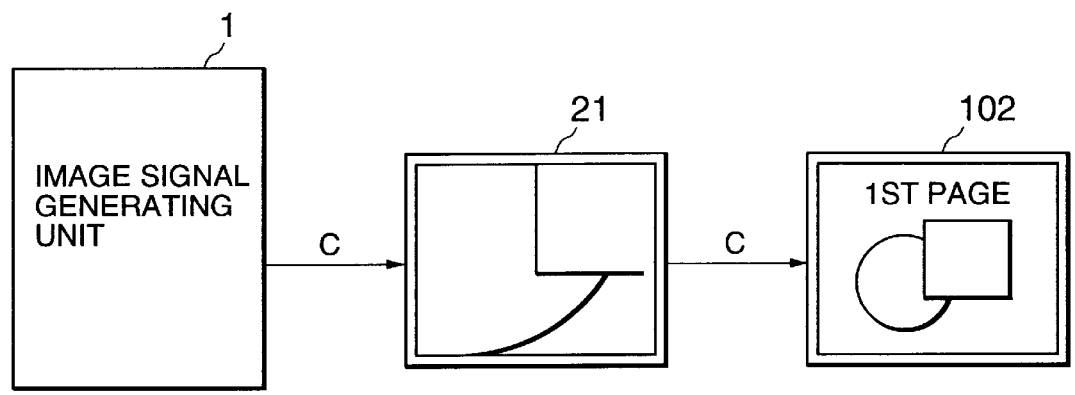
FIG. 33 illustrates the system configuration of the sixth embodiment.

Referring to FIG. 33, a first image display unit 21 of the invented type, incorporating a zoom processor, receives the composite signal C from the image signal generating unit 1, and passes the composite signal C to a second image display unit 102. The second image display unit 102 may be of either the invented type or the conventional type. It will be assumed below that the second image display unit 102 is of the conventional type.

Figure 34:
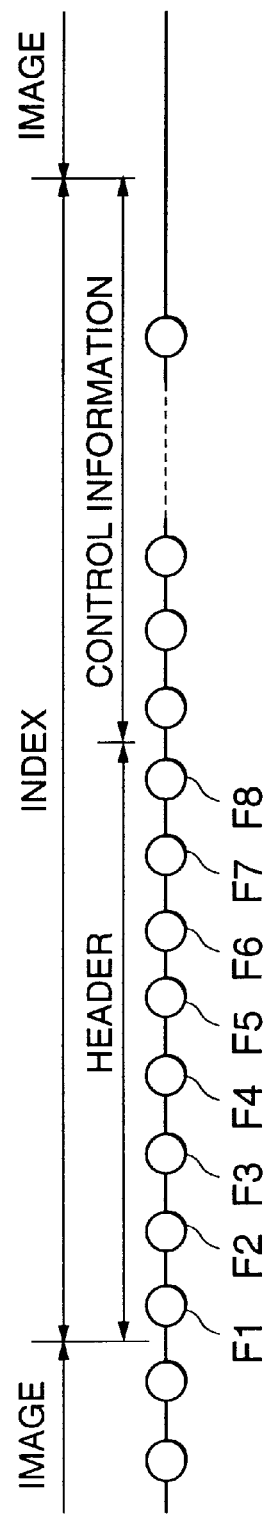
FIG. 34 illustrates the structure of the index signal in the sixth embodiment.

Referring to FIG. 34, the index signal generated by the indexer 4 in the image signal generating unit 1 in the sixth embodiment comprises the flag pixels F1 to F8 described above, and further pixels encoding control information. The control information specifies the part of the image data Dr to be enlarged by the zoom processor 28 in first image display unit 21. For example, the control information may comprise the current value of the mouse-pointer coordinates. The index data ID received by the index tester 11 in the first image display unit 21 include the control information as well as the flag values. When the flag values select the first image display unit 21, the index tester 11 generates a zoom control signal ZS such that the image area enlarged by the zoom processor 28 includes the mouse-pointer location.

The sixth embodiment is particularly useful when the image signal generating unit 1 generates an image signal with a higher resolution than the resolution of the image display units 21, 102. In this case, the second image display unit 102 displays the entire image at a reduced resolution, while first image display unit 21 displays part of the image at its full resolution, as shown in FIG. 33. That is, the zoom processor 28 trims the image to the size of the screen of first image display unit 21. If the mouse pointer moves off the screen, the index tester 11 adjusts the zoom control signal ZS to have the displayed area follow the mouse pointer.

In a variation of the sixth embodiment, the user selects the zoom ratio from a menu or other control item provided by software. The indexer 4 specifies the zoom ratio in the control information in the index signal. The index tester 11 specifies the zoom ratio in the zoom control signal ZS.

In another variation, two or more image display units 21 of the invented type are provided, each displaying a different page, or each zooming in on a different part of the same page.

Figure 35:
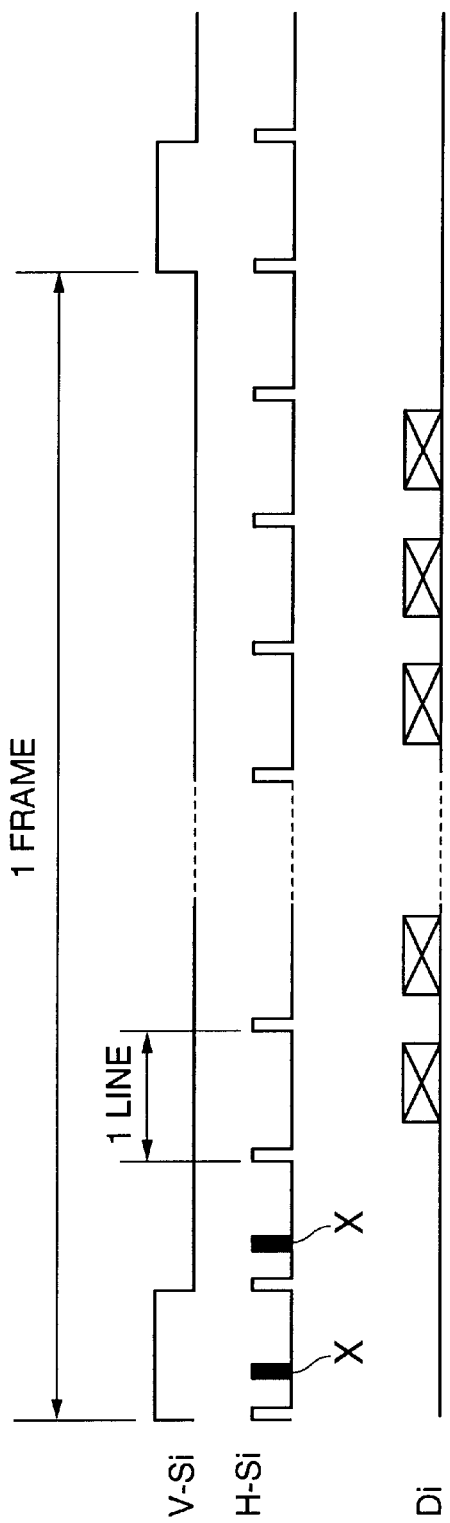
FIG. 35 is a timing diagram illustrating the location of the index signal in a seventh embodiment.

Next, a seventh embodiment will be described. In the image signal generating unit 1 in the seventh embodiment, the indexer 4 adds the index signal to a non-displayed interval of the image signal, as in FIG. 13, replacing part of the synchronizing signal. For example, the index signal X is inserted into the horizontal synchronizing H-Si at the locations shown in FIG. 35, in the vertical blanking interval.

Inserting the index signal X into the horizontal synchronizing signal H-Si is comparatively easy, because both signals are binary signals that switch between the same two voltage levels, such as zero volts and five volts. The image signal output unit 5 combines the vertical and horizontal synchronizing signals, including the index signal added by the indexer 4, with the image signal and transmits the resulting composite signal to the image display unit 2.

Figure 36:
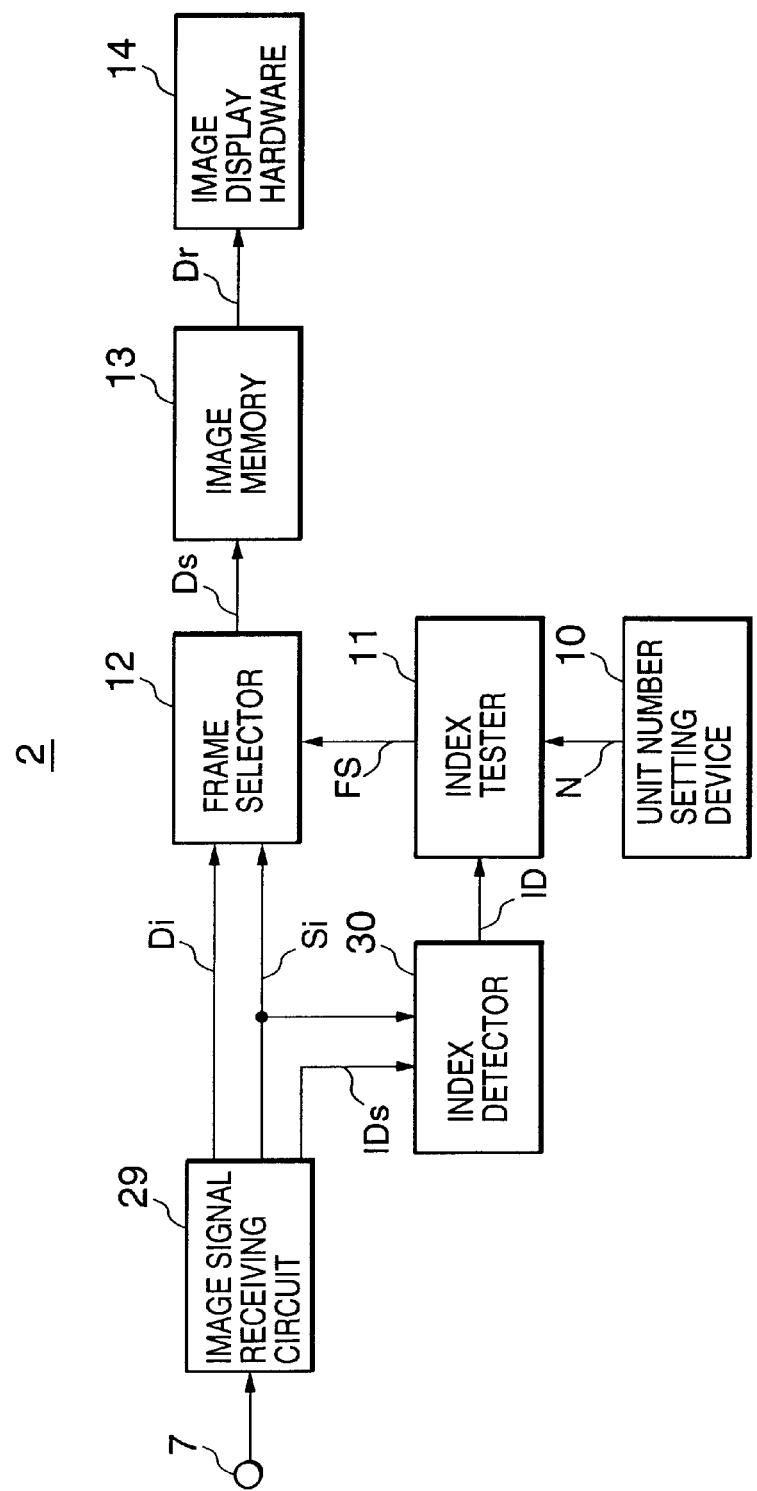
FIG. 36 is a block diagram showing the internal structure of an image display unit in the seventh embodiment.

Referring to FIG. 36, the image display unit 2 in the seventh embodiment has an image signal receiving circuit 29 that separates the composite signal received at the input terminal 7 into an image signal Di, a synchronizing signal Si, and an index signal IDs. The synchronizing signal Si and index signal IDs are supplied to an index detector 30, which extracts the index data ID and supplies the index data to the index tester 11. The synchronizing signal Si and image signal Di are supplied to the frame selector 12.

Figure 37:
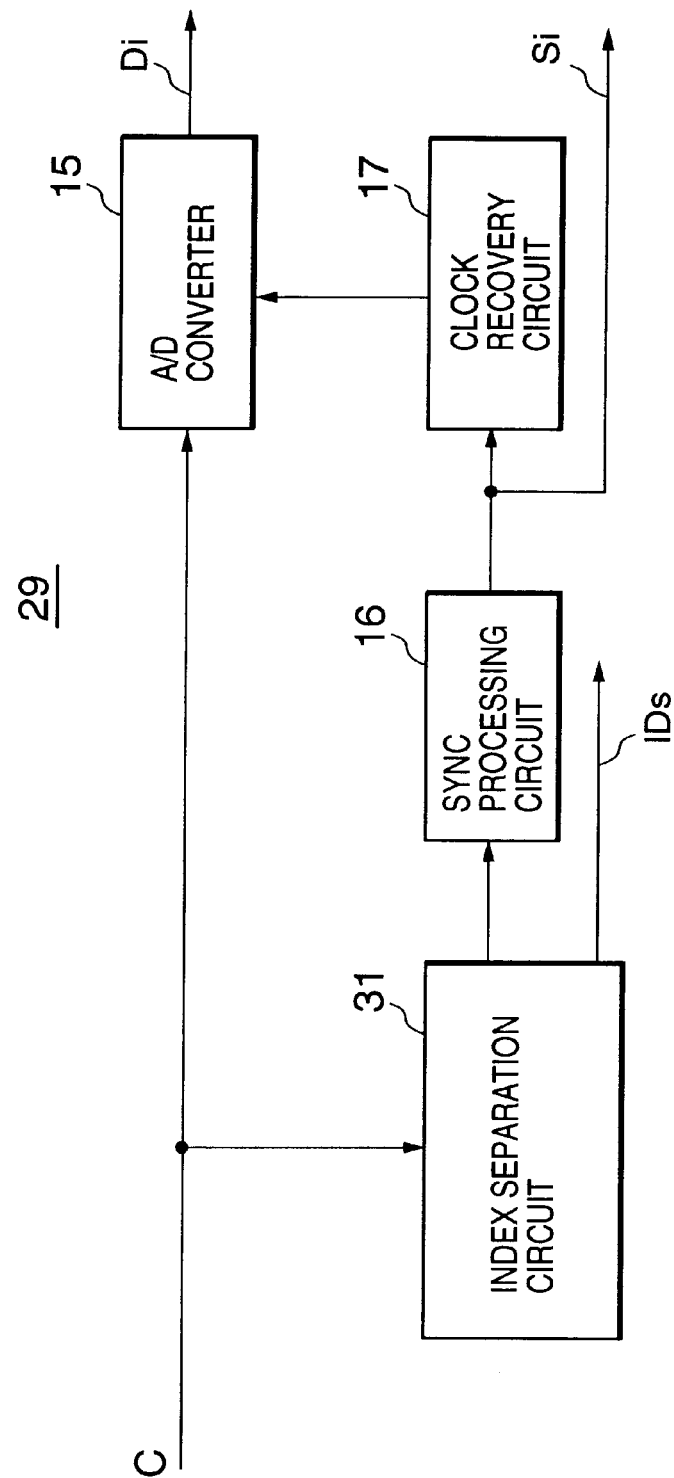
FIG. 37 is a block diagram showing the internal structure of the image signal receiving circuit in the seventh embodiment.

Referring to FIG. 37, the image signal receiving circuit 29 comprises an A/D converter 15, a synchronizing signal processing circuit 16, and a clock recovery circuit 17 as in the first embodiment, and an additional index separation circuit 31. The index separation circuit 31 has gating circuits that separate the synchronizing signal and the index signal from the composite signal C. These gating circuits supply the index signal IDs to the index detector 30, while the synchronizing signal is supplied to the synchronizing signal processing circuit 16. The A/D converter 15, synchronizing signal processing circuit 16, and clock recovery circuit 17 operate as described in the first embodiment.

Referring again to FIG. 36, since the index signal IDs supplied to the index detector 30 includes only index information, without synchronizing pulses or image data, the index detector easily and accurately detects the index data pulses, even in the presence of noise. In detecting the index signal, the index detector 30 makes use of timing. information provided by the synchronization signal Si output from the image signal receiving circuit 29. Subsequent operations are the same as in the first embodiment.

The index data ID supplied to the index tester 11 are highly reliable, because the index signal IDs received by the index detector 30 is not embedded in a part of the image signal that has varying luminance levels.

Since the index signal occurs during a non-displayed interval of the image signal, the index signal is not visible to the user, and no image information is lost.

Since the index signal precedes the image signal, the index signal can be added to the frame to which it applies, as in FIG. 14.

In a variation of the seventh embodiment, the index signal is inserted in the vertical synchronizing signal instead of the horizontal synchronizing signal. Alternatively, the position of the index signal on the time axis is determined with respect to the vertical synchronizing signal.

In all of the preceding embodiments, a single image signal generating unit, generating a single image signal in a standard format, directs different images or pages to different image display units by adding an index signal to the image signal, replacing part of the image signal. The index signal may be encoded in the luminance values of a small number of pixels in the image signal. The index signal has flags corresponding to unit numbers of the image display units. By comparing its own unit number with the index signal, each image display unit selects certain image frames for display. A reference image can be stored and displayed on one image display unit while input or editing work proceeds on another image display unit.

In a digital image signal, the index signal can be made inconspicuous by using only the least significant bits of the index pixels, as described in the second embodiment, and by masking the index data when the image is displayed. The index signal can also be made inconspicuous by having each image display unit store the most recent index data, as in the third embodiment, so that the index signal does not have to be transmitted in every frame. Alternatively, the image signal can be made invisible by being embedded in a non-displayed part of the image signal, as in the seventh embodiment and a variation of the first embodiment.

Requirements for synchronization between the image signal and index signal can be relaxed by the use of an index value that does not select any image display device.

The reliability of the index information can be enhanced by adding parity check information, or by providing a separate check pixel for each flag pixel. For easy detection, the index signal may include a header. The index signal may also include control information, such as the zoom control information in the sixth embodiment.

Connection of the image display units is simplified if the image display units are interconnected in a chained manner, as described in the fourth embodiment. Degradation of the image signal can be prevented by regenerating the image signal in each image display unit, enabling a substantially unlimited number of image display units to be connected. Addition of image display units is further simplified by having the image display units communicate with one another and establish their own unit numbers automatically, as in the fifth embodiment.

Numerous variations of the above embodiments have been described, but those skilled in the art will recognize that still further variations are possible within the scope of the invention as set forth below.

What is claimed is:

1. An image signal generating apparatus, comprising:
   an image signal generator generating an image signal having pixels within an image frame; and
   an indexer operatively connected to said image signal generator, said indexer generating an index signal and placing the index signal at a position of a pixel included in the image frame;
   wherein the index signal designates an image display unit receiving the image signal to display at least a part of the image signal.

2. The image signal generating apparatus of claim 1, wherein the indexer places the index signal at the position of the pixel by manipulating luminance levels of the pixel in the image frame.

3. The image signal generating apparatus of claim 2, wherein the image signal is a digital signal, and the indexer places the index signal at the position of the pixel by manipulating least significant bits of the pixel.

4. The image signal generating apparatus of claim 1, wherein the image signal switches among a plurality of pages, and the index signal has different values for different ones of said pages.

5. The image signal generating apparatus of claim 1, wherein the image signal has a displayed interval and a non-displayed interval, and the indexer adds the index signal to the image signal in the displayed interval.

6. The image signal generating apparatus of claim 1, wherein one value of the index signal prevents the image signal from being displayed by any image display unit.

7. The image signal generating apparatus of claim 1, wherein the index signal includes parity check information.

8. The image signal generating apparatus of claim 1, wherein the index signal comprises a first plurality of pixels selecting different image display units, and a second plurality of pixels for checking the first plurality of pixels.

9. The image signal generating apparatus of claim 1, wherein the index signal includes data by which the index signal is identified.

10. The image signal generating apparatus of claim 1, wherein the index signal also comprises control information.

11. The image signal generating apparatus of claim 10, wherein the control information in the index signal controls display of the image signal by the designated image display unit.

12. The image signal generating apparatus of claim 1, wherein one value of the index signal indicates that every image display unit receiving the image signal is to display part or all of the received image signal.

13. The image signal generating apparatus of claim 12, wherein said one value of the index signal indicates that the image signal pertains to all image display units connected to the image signal generating apparatus.

14. The image signal generating apparatus of claim 1, wherein the indexer replaces part of certain pixels of the image frame with the index signal.

15. A method of generating an image signal comprising:

outputting the image signal having pixels within an image frame;

generating an index signal including at least selection information enabling the image signal to be displayed selectively by a designated image display unit;

placing the index signal at a position of a pixel included in the image frame;

wherein the index signal designates the image display unit receiving the image signal to display at least a part of the image signal.

16. The method of claim 15, wherein said placing step places the index signal at the position of the pixel by manipulating luminance levels of the pixel in the image frame.

17. The method of claim 16, wherein the image signal is a digital signal, and said placing step places the index signal at the position of the pixel by manipulating least significant bits of the pixel.

18. The method of claim 15, wherein the image signal comprises a plurality of pages, each page including at least one frame, and the index signal has different values for different ones of said pages.

19. The method of claim 15, wherein the image signal comprises a plurality of frames, each frame having a displayed interval and a non-displayed interval, and the index signal is placed in a part of the displayed interval.

20. The method of claim 15, wherein one value of the index signal prevents the image signal from being displayed by any image display unit.

21. The method of claim 15, wherein the index signal includes parity check information.

22. The method of claim 15, wherein the index signal comprises a first plurality of pixels selecting different image display units, and a second plurality of pixels for checking the first plurality of pixels.

23. The method of claim 15, wherein the index signal includes data by which the index signal is identified.

24. The method of claim 15, wherein the index signal also comprises control information.

25. The method of claim 24, wherein the control information in the index signal controls display of the image signal by the designated image display unit.

26. The method of claim 15, wherein one value of the index signal indicates that every image display unit receiving the image signal is to display part or all of the received image signal.

27. The method of claim 26, wherein said one value of the index signal indicates that the image signal pertains to all image display units connected to the image signal generating apparatus.

28. The method of claim 15, wherein the index signal placing process also comprises replacing part of certain pixels of the image frame with the index.

* * * * *